United States Patent
Gonzalez et al.

(10) Patent No.: US 7,418,575 B2
(45) Date of Patent: *Aug. 26, 2008

(54) LONG INSTRUCTION WORD PROCESSING WITH INSTRUCTION EXTENSIONS

(75) Inventors: Ricardo E. Gonzalez, Los Altos, CA (US); Scott Johnson, Cupertino, CA (US); Derek Taylor, Santa Clara, CA (US)

(73) Assignee: Stretch, Inc., Sunnyvale, CA (US)

( * ) Notice: Subject to any disclaimer, the term of this patent is extended or adjusted under 35 U.S.C. 154(b) by 166 days.

This patent is subject to a terminal disclaimer.

(21) Appl. No.: 11/129,146

(22) Filed: May 12, 2005

(65) Prior Publication Data

US 2006/0259747 A1  Nov. 16, 2006

Related U.S. Application Data

(63) Continuation-in-part of application No. 11/099,280, filed on Apr. 4, 2005, now Pat. No. 7,284,114, which is a continuation of application No. 10/732,392, filed on Dec. 9, 2003, now Pat. No. 6,954,845, which is a continuation-in-part of application No. 10/630,542, filed on Jul. 29, 2003.

(51) Int. Cl.
*G06F 9/30* (2006.01)
*G06F 7/00* (2006.01)

(52) U.S. Cl. ................ 712/15; 712/226; 712/24; 712/20; 712/215; 712/217

(58) Field of Classification Search ............ 715/771, 715/762; 712/36, 226, 217, 15; 710/36, 710/2; 382/243

See application file for complete search history.

(56) References Cited

U.S. PATENT DOCUMENTS

| 4,635,261 A | 1/1987 | Anderson et al. |
| 4,766,569 A | 8/1988 | Turner et al. |
| 4,783,738 A * | 11/1988 | Li et al. ............... 712/21 |

(Continued)

FOREIGN PATENT DOCUMENTS

EP  0507507 A2  7/1992

(Continued)

OTHER PUBLICATIONS

Intel and Hewlett Packard, IA-64 Application Instruction Set Architecture Guide, Rev. 1.0, 1999, p. C-1 through C, 1999.*

(Continued)

*Primary Examiner*—Henry Tsai
*Assistant Examiner*—Cheng-Yuan Tseng
(74) *Attorney, Agent, or Firm*—Carr & Ferrell LLP

(57) ABSTRACT

A system for adding reconfigurable computational instructions to a computer, the system comprising a processor operable to execute a set of instructions of a computer program comprising a set of computational instructions and long instruction word instructions with at least one of the long instruction word instructions comprising an instruction extension, an extension adapter coupled to the processor and operable to detect the execution of the instruction extension, and programmable logic coupled to the extension adapter and operable to receive configuration data for defining the instruction extension and execute the instruction extension.

25 Claims, 15 Drawing Sheets

U.S. PATENT DOCUMENTS

| | | | |
|---|---|---|---|
| 4,893,311 A | 1/1990 | Hunter et al. | |
| 5,055,997 A | 10/1991 | Sluijter et al. | |
| 5,247,689 A | 9/1993 | Ewert | |
| 5,258,668 A | 11/1993 | Cliff et al. | |
| 5,260,610 A | 11/1993 | Pedersen et al. | |
| 5,260,611 A | 11/1993 | Cliff et al. | |
| 5,274,581 A | 12/1993 | Cliff et al. | |
| 5,274,782 A | 12/1993 | Chalasani et al. | |
| 5,299,317 A | 3/1994 | Chen et al. | |
| 5,343,406 A | 8/1994 | Freeman et al. | |
| 5,357,152 A | 10/1994 | Jennings, III | |
| 5,361,373 A | 11/1994 | Gilson | |
| 5,414,377 A | 5/1995 | Freidin | |
| 5,426,378 A | 6/1995 | Ong | |
| 5,436,574 A | 7/1995 | Veenstra | |
| 5,471,628 A | 11/1995 | Phillips et al. | |
| 5,488,612 A | 1/1996 | Heybruck | |
| 5,517,627 A | 5/1996 | Petersen | |
| 5,535,406 A | 7/1996 | Kolchinsky | |
| 5,619,665 A | 4/1997 | Emma | |
| 5,636,224 A | 6/1997 | Voith et al. | |
| 5,652,875 A | 7/1997 | Taylor | |
| 5,682,493 A * | 10/1997 | Yung et al. | 712/217 |
| 5,684,980 A | 11/1997 | Casselman | |
| 5,696,956 A | 12/1997 | Razdan et al. | |
| 5,726,584 A | 3/1998 | Freidin | |
| 5,742,180 A | 4/1998 | DeHon et al. | |
| 5,784,636 A | 7/1998 | Rupp | |
| 5,819,064 A | 10/1998 | Razdan et al. | |
| 5,822,588 A | 10/1998 | Sterling et al. | |
| 5,828,835 A | 10/1998 | Isfeld | |
| 5,847,578 A | 12/1998 | Noakes et al. | |
| 5,850,564 A | 12/1998 | Ting et al. | |
| 5,920,202 A | 7/1999 | Young et al. | |
| 5,926,036 A | 7/1999 | Cliff et al. | |
| 5,943,150 A | 8/1999 | Deri | |
| 5,956,518 A | 9/1999 | DeHon et al. | |
| 5,963,050 A | 10/1999 | Young et al. | |
| 5,977,793 A | 11/1999 | Reddy et al. | |
| 5,982,195 A | 11/1999 | Cliff et al. | |
| 5,986,465 A | 11/1999 | Mendel | |
| 5,999,734 A | 12/1999 | Willis et al. | |
| 6,026,478 A * | 2/2000 | Dowling | 712/24 |
| 6,092,174 A | 7/2000 | Roussakov | |
| 6,167,502 A | 12/2000 | Pechanek et al. | |
| 6,219,628 B1 * | 4/2001 | Kodosky et al. | 703/2 |
| 6,237,079 B1 | 5/2001 | Stoney | |
| 6,292,388 B1 | 9/2001 | Camarota | |
| 6,343,337 B1 | 1/2002 | Dubey et al. | |
| 6,353,841 B1 | 3/2002 | Marshall et al. | |
| 6,374,403 B1 * | 4/2002 | Darte et al. | 717/161 |
| 6,415,424 B1 | 7/2002 | Arimilli et al. | |
| 6,418,045 B2 | 7/2002 | Camarota | |
| 6,426,648 B1 | 7/2002 | Rupp | |
| 6,467,009 B1 * | 10/2002 | Winegarden et al. | 710/305 |
| 6,505,241 B2 | 1/2003 | Pitts | |
| 6,557,092 B1 | 4/2003 | Callen | |
| 6,622,233 B1 | 9/2003 | Gilson | |
| 6,633,181 B1 | 10/2003 | Rupp | |
| 6,698,015 B1 | 2/2004 | Moberg et al. | |
| 6,721,884 B1 | 4/2004 | De Oliveira Kastrup Pereira et al. | |
| 6,732,354 B2 | 5/2004 | Ebeling et al. | |
| 6,744,274 B1 | 6/2004 | Arnold et al. | |
| 6,795,900 B1 | 9/2004 | Miller et al. | |
| 6,799,236 B1 | 9/2004 | Dice et al. | |
| 6,817,013 B2 | 11/2004 | Tabata et al. | |
| 6,831,690 B1 | 12/2004 | John et al. | |
| 6,857,110 B1 | 2/2005 | Rupp et al. | |
| 6,874,110 B1 | 3/2005 | Camarota | |
| 6,883,084 B1 | 4/2005 | Donohoe | |
| 6,954,845 B2 * | 10/2005 | Arnold et al. | 712/36 |
| 6,968,544 B1 | 11/2005 | Schneider | |
| 6,986,127 B1 * | 1/2006 | Newlin et al. | 717/135 |
| 6,996,709 B2 | 2/2006 | Arnold et al. | |
| 7,000,211 B2 | 2/2006 | Arnold | |
| 7,062,520 B2 | 6/2006 | Rupp | |
| 7,086,047 B1 * | 8/2006 | Edwards et al. | 717/160 |
| 7,178,062 B1 | 2/2007 | Dice | |
| 7,200,735 B2 * | 4/2007 | Wang et al. | 712/33 |
| 7,254,142 B2 | 8/2007 | Hagsand | |
| 2001/0049816 A1 | 12/2001 | Rupp | |
| 2003/0046513 A1 | 3/2003 | Furuta et al. | |
| 2003/0097546 A1 | 5/2003 | Taylor | |
| 2003/0108119 A1 | 6/2003 | Mohebbi et al. | |
| 2003/0120889 A1 | 6/2003 | Roussel et al. | |
| 2003/0196058 A1 | 10/2003 | Ramagopal et al. | |
| 2004/0019765 A1 | 1/2004 | Klein, Jr. | |
| 2004/0186872 A1 | 9/2004 | Rupp | |
| 2004/0193852 A1 | 9/2004 | Johnson | |
| 2004/0208602 A1 | 10/2004 | Plante | |
| 2005/0027970 A1 * | 2/2005 | Arnold et al. | 712/226 |
| 2005/0027971 A1 | 2/2005 | Williams et al. | |
| 2005/0166038 A1 | 7/2005 | Wang et al. | |
| 2005/0268271 A1 * | 12/2005 | Gutberlet et al. | 716/18 |

FOREIGN PATENT DOCUMENTS

| | | |
|---|---|---|
| EP | 0668659 A2 | 8/1995 |
| EP | 1 443 417 | 8/2004 |
| TW | 478 252 | 3/2002 |
| TW | 480 818 | 3/2002 |
| TW | 152355 | 7/2002 |
| TW | 152994 | 7/2002 |
| TW | 509 798 | 11/2002 |
| TW | 168210 | 4/2003 |

OTHER PUBLICATIONS

Kai Hwang, Advanced Computer Architecture, McGraw Hill, 1993, p. 182-184.*

Ricardo E. Gonzalez, Xtensa: A Configurable And Extensible Processor, Mar.-Apr. 2000, IEEE Micro, pp. 60-70.*

Pedro Diniz et al., Automatic Synthesis of Data Storage and Control Structures for FPGA-based Computing Engines, 2000, IEEE, pp. 91-100.* http://www.tensilica.com/products/xtensa_overview.htm.*

Bechade et al. "Programmable Arithmetic/Logic Circuits," IBM Technical Disclosure Bulletin, U. S. IBM Corp., New York, vol. 3, No. 11, Apr. 1981, pp. 4870-4873, XP-000713711.

Ye et al., "Chimaera: A High-Performance Architecture with a Tightly-Coupled Reconfigurable Functional Unit," Proceedings of the 27th International Symposium on computer Architecture, IEEE, Jun. 10-14, 2000, pp. 225-235.

"MIPS Extension for Digital Media with 3D," MIPS Technologies, Inc., Dec. 27, 1996.

Borgatti et al., "A Reconfigurable System Featuring Dynamically Extensible Embedded Microprocessor, FPGA and Customisable I/O", IEEE 2002 Custom INtegrated Circuits Conference, pp. 1-4.

Razdan et al. "A High-Performance Microarchitecture with Hardware-Programmable Functional Units", Proc. of MICRO-27, Nov. 1994.

Beeck et al., "CRISP: A Template for Reconfigurable Instruction Set Processors," FPL 2001, LNCS 2147, pp. 296-305, Springer-Verlag Berlin Heidelberg, 2001.

U.S. Appl. No. 10/746,018, filed Dec. 23, 2003 Rupp et al.

Tanenbaum, Andrew S., "Modern Operating Systems," Second Edition, 2001, Prentice Hall, Inc., New Jersey.

Scott, Steven L., et al., "The Clay T3E Network: Adaptive Routing in High Performance 3D Torus," HOT Interconnects IV, Stanford University, Aug. 15-16, 1996.

Lee, K.C., "A Virtual Bus Architecture for Dynamic Parallel Processing," IEEE Transactions on Parallel and Distributed Systems, vol. 4, No. 2, Feb. 1993, pp. 121-130.

Hennessey, John L., et al., "Computer Organization and Design, The Hardware/Software Interface," Second Edition, 1998, Morgan Kaufmann Publishers, Inc., San Francisco, California.

Golestani, S. Jamaloddin, "A Stop-and-go Queueing Framework for Congestion Management," Bell Communications Research, Morristown, New Jersey, 1990, Association for Computing Mechinery.

Goldblatt, Kim. "The Low-Cost, Efficient Serial Configuration of Spartan FPGAs," Xilinx, XAPP098, Nov. 13, 1998, Version 1.0.

Garlan, David, et al., "An Introduction to Software Architecture," CMU-CS-94-166, School of Computer Science, Carnegie Mellon University, Pittsburgh, PA, 1994.

Dehon, Andre, "Transit Note #118, Notes on Coupling Processors with Reconfigurable Logic," M.I.T. Transit Project, Mar. 21, 1995.

Dally, William J., et al., "Deadlock Free Message Routing in Multiprocessor Interconnection Networks," Computer Science Department, California Institute of Technology, May 10, 1985.

Borkar, Shekhar, et al., "iWarp: An Intergrated Solution to High-Speed Parallel Computing," IEEE 1998, pp. 330-339.

Barat, Francisco, et al., "Reconfigurable Instruction Set Processors: A Survey," IEEE 2000.

Waingold, Elliot, et al., "Baring It All to Software: Raw Machines," Computer, Sep. 1997, IEEE, pp. 86-93.

Taylor, Michael Bedford, et al., "The Raw Microprocessor: A Computational Fabric for Software Circuits and General-Purpose Programs," Microarchitecture, IEEE Micro, Mar.-Apr. 2002, pp. 25-35.

U.S. Appl. No. 10/404,706, filed Mar. 31, 2003, Scott D. Johnson.
U.S. Appl. No. 10/630,542, filed Jul. 29, 2003, Kenneth M. Williams.
U.S. Appl. No. 10/686,882, filed Oct. 15, 2003, Kenneth Williams.
U.S. Appl. No. 10/750,714, filed Dec. 31, 2003, Ricardo Gonzalez.
U.S. Appl. No. 10/815,453, filed Mar. 31, 2004, Ricardo Gonzalez.
U.S. Appl. No. 10/971,372, filed Oct. 22, 2004, Charle' R. Rupp.
U.S. Appl. No. 11/021,247, filed Dec. 21, 2004, Ricardo Gonzalez.
U.S. Appl. No. 11/099,280, filed Apr. 4, 2005, Jeffrey M. Arnold.
U.S. Appl. No. 11/204,555, filed Aug. 15, 2005, Jeffrey M. Arnold.

* cited by examiner

| | |
|---|---|
| RISC ADD A0, A10, 8 | 600 |
| RISC SUB A6, A10, 8 | 605 |
| RISC ADD A4, A10, 8 | 610 |
| ISEF INIT A3 | 615 |
| RISC SUB A1, A9, 16 | 620 |
| RISC ADD A2, A9, 8 | 625 |
| ISEF WR A0, A1, A2 | 630 |
| RISC ADD A7, A9, 8 | 635 |
| ISEF WR A6, A7, 0 | 640 |
| RISC SUB A0, A10, 8 | 645 |
| RISC ADD A5, A9, 8 | 650 |
| ISEF WR A4, A5, 0 | 655 |
| RISC SUB A3, A9, 8 | 660 |
| OR ADD A9, A4, 4 | 665 |
| ISEF WR A0, A3, 0 | 670 |
| RISC ADD A0, A9, 16 | 675 |

FIG. 6

| | | |
|---|---|---|
| RISC ADD A0, A10, 8 | | 700 |
| RISC SUB A6, A10, 8 | | 710 |
| ISEF INIT A3 | RISC ADD A4, A10, 8 | 720 |
| RISC SUB A1, A9, 16 | | 730 |
| ISEF WR A0, A1, A2 | RISC ADD A2, A9, 8 | 740 |
| OR ADD A9, A4, 4 | RISC ADD A7, A9, 8 | 750 |
| ISEF WR A6, A7, 0 | RISC SUB A0, A10, 8 | 760 |
| ISEF WR A4, A5, 0 | RISC ADD A5, A9, 8 | 770 |
| ISEF WR A0, A3, 0 | RISC SUB A3, A9, 8 | 780 |
| RISC ADD A0, A9, 16 | | 790 |

FIG. 7

| | |
|---|---|
| REG. ID 1320a / AGE 1330a | WRITE PORT 1340a |
| REG. ID 1320b / AGE 1330b | WRITE PORT 1340b |
| REG. ID 1320c / AGE 1330c | WRITE PORT 1340c |
| REG. ID 1320d / AGE 1330d | WRITE PORT 1340d |
| REG. ID 1320e / AGE 1330e | WRITE PORT 1340e |
| REG. ID 1320f / AGE 1330f | WRITE PORT 1340f |

FIG. 13

LONG INSTRUCTION WORD PROCESSING WITH INSTRUCTION EXTENSIONS

CROSS-REFERENCE TO RELATED APPLICATIONS

This application is a continuation-in-part of and claims the benefit of and priority to U.S. patent application Ser. No. 11/099,280, filed on Apr. 4, 2005, now U.S. Pat. No. 7,284,114, titled "VIDEO PROCESSING SYSTEM WITH RECONFIGURABLE INSTRUCTIONS," which is a continuation of Ser. No. 10/732,392, now U.S. Pat. No. 6,954,845 filed on Dec. 9, 2003 and titled "RECONFIGURABLE INSTRUCTION SET COMPUTING." This application is related to U.S. patent application Ser. No. 10/732,392 (now U.S. Pat. No. 6,954,845) titled "Reconfigurable Instruction Set Computing" filed Dec. 9, 2003, which is a continuation-in-part of U.S. patent application Ser. No. 10/630,542 titled "Defining Instruction Extensions in a Standard Programming Language" filed on Jul. 29, 2003. The subject matter of this application is also related to U.S. patent application Ser. No. 10/404,706 titled "Extension Adapter" filed on Mar. 31, 2003. All of the aforementioned applications and patents are commonly assigned with the present application. Each of the related applications is hereby incorporated by reference herein.

BACKGROUND

1. Field of the Invention

The present invention relates generally to processing systems, and more particularly to long instruction word processing with instruction extensions.

2. Description of the Prior Art

Computer processors can generally be sorted into two classes: general-purpose processors that can be adapted to a multitude of applications and application-specific processors that are optimized to serve specific applications. General-purpose processors are designed to run a general instruction set, namely a set of instructions that the processor will recognize and execute. Such general instruction sets tend to include a large number of instructions in order to support a wide variety of programs.

Application-specific processors are designed to run a more limited instruction set, where the instructions are more tailored or specific to a particular application. While an application-specific processor can enable certain programs to execute much faster than when run on a general-purpose processor, they are more limited in functionality due to the limited instruction sets they run.

One technique to increase speed of instruction execution is to bundle instructions within a Long Instruction Word (LIW) instruction to allow for parallel processing of the operations. LIW instructions comprise two or more operations. An operation is an individual instruction. LIW instructions are limited to the operations that are native to the processor. Some examples of LIW instructions are very long instruction word instructions and ultra long instruction word instructions.

Another technique for improving speed of instruction execution is pipelining in which multiple individual instructions overlap in execution. The processor will generally process individual instructions through several consecutive stages. When individual instructions are pipelined, the stages of one individual instruction may overlap with another. The individual instruction data marches through the pipeline until it reaches the end of the pipeline. The length of the pipeline is determined by the maximum cycle at which a write can occur. As the number of stages increase, the pipeline also increases.

A stage is a step to process an individual instruction. For example, within a five-stage instruction processor, each individual instruction is first issued (stage 1), the registers of the individual instruction are read (stage 2), an operation is executed or an address calculated (stage 3), an operand is accessed from a first register (stage 4), and the result is written into a second register (stage 5.) Generally, the processor may process each stage during one clock cycle. Depending on the architecture of the system, there may be any number of stages.

One problem with pipelining is that pipelining requires numerous hardware components. Individual instructions frequently depend upon values within registers produced by other individual instructions. If a second individual instruction depends upon a value produced by a first individual instruction, the second individual instruction may have to stall one or more clock cycles until the needed value is written to the correct register. The process of stalling an individual instruction in the prior art requires several hardware components for every processing stage. As the length of the pipeline increases, the amount of area dedicated to the pipeline grows. As a result, the pipeline can greatly dwarf the size of a register file.

Further, not all individual instructions are committed upon issuance. In some instances, an individual instruction is not committed until a later processing stage. As a result, the pipeline holds the individual instruction for several processing stages until the individual instruction is committed. This process requires additional hardware components for every stage.

FIG. 1 is an illustration of a pipeline implementation with a five-stage instruction processor in the prior art. In this illustration, three individual instructions 110, 115, and 120 are pipelined.

Each stage may be processed within one clock cycle 101-108. The processor may process each stage once within a single clock cycle. In one example not depicted, there may be a different individual instruction in each stage. Each stage will be processed once within the single clock cycle. Subsequently, each individual instruction proceeds to the next stage.

In the first clock cycle 101, the individual instruction 110 is issued ("ISSUE") 125a in stage one. In a second clock cycle 102, the registers of the first individual instruction 110 are read ("READ") 130a and the second individual instruction 115 is issued 130b. In the third clock cycle 103, the first individual instruction 110 is executed ("EXE") 135a but the second individual instruction 115 and the third individual instruction 120 are stalled.

The second individual instruction 115 depends upon the value within register $A1 from the first individual instruction 110. The value of register $A1 will not be available until the first individual instruction 110 writes ("WRITE") 145a the value to register $A1 in the fifth clock cycle 105. If the second individual instruction 115 executes 145b before the first individual instruction 110 writes the value to register $A1, the second individual instruction 115 will produce an erroneous result. Consequently, the second individual instruction 115 must stall within the pipeline. The second individual instruction 115 will stall during clock cycle 103 and then proceed to the next stage in clock cycle 104.

The third individual instruction 120 does not depend on either individual instruction 110 or individual instruction 115, however, each stage must be processed only once within a clock cycle. If the third individual instruction 120 is not stalled, then the third individual instruction 120 will attempt to proceed with the read 145c stage at the same time as the second individual instruction 115. Consequently, the third individual instruction 120 stalls for one clock cycle 103 and then proceeds to the next stage in clock cycle 104.

In a fourth clock cycle 104, the operand of the first individual instruction 110 is accessed from a register or the operand is accessed from another memory ("MEM") 140a. The registers of the second individual instruction 115 are read 140b and the third individual instruction 120 issues 140c.

In the fifth clock cycle 105, the register $A1 of the first individual instruction 110 is written to ("WRITE") 145a and the processing of the first individual instruction 110 is completed. Now that the $A1 register is written, the second individual instruction 115 may proceed so the second individual instruction 115 is executed 145b. The registers of the third individual instruction 120 are read 145c. Subsequent clock cycles 106, 107, and 108 proceed without stall since there are no more dependencies or stage conflicts between the individual instructions 110, 115, and 120.

FIG. 2 is an illustration of a four-stage pipeline 200 in the prior art. Register values enter flip flop 265 and multiplexers ("MUX") 230, 235, and 240 through signal paths 205, 210, 215, and 220, respectively. Control signals 250, 255, and 260 control the multiplexers 230, 235, and 240, respectively. The register value may pass through each multiplexer 230, 235, and 240 to flip flops 270, 275, and 280, respectively.

A register value that is available within the first stage is sent through the signal path 205 into the flip flop 265. The register values that are available within the second, third, and fourth stages are sent through signal paths 210, 215, and 220, respectively. The register values sent through signal paths 210, 215, and 220, proceed to multiplexers 230, 235, and 240.

The register values may proceed from multiplexers 230, 235, and 240, to flip flops 270, 275, and 280, respectively. Multiplexer ("MUX") 285 may access the register values from the flip flops 265, 270, 275, and 280 as well as the register values from the register file 287. Control signal 292 controls multiplexer 285.

Even if multiplexer 285 accesses a register value at flip flop 265, 270, 275, and 280, all register values will proceed to the register file 287. For example, if a register value is available in the first stage, the register value may be accessed by multiplexer 285 and still pass from the flip flop 265 through the multiplexers 230, 235, 240 and flip flops 270, 275, 280, until being sent to the register file 287. The register file 287 comprises one or more registers that may store register values, one or more read ports and one or more write ports. Any register values received by the multiplexer 285 are sent to the flip flop 290, which delivers the register value to a processor through signal path 295.

Although pipelining saves time by overlapping individual instructions, numerous hardware components are necessary to implement the pipeline. For example, the number of registers necessary to implement a pipeline may be calculated as follows: Number of registers=(number of stages)×(width of stage)+(staging registers). In one example, assuming 32 stages with 128-bits in length and 7072 staging registers for pipelining, 32×128+7072=11,170 registers. As a result, the number of hardware components, including flip flops, multiplexers, and registers may be cost prohibitive. Moreover, as the number of components increases, valuable space taken by the components within a chip or printed circuit board also increases.

SUMMARY OF THE INVENTION

A system for adding reconfigurable computational instructions to a computer, the system comprising a processor operable to execute a set of instructions of a computer program comprising a set of computational instructions and long instruction word instructions with at least one of the long instruction word instructions comprising an instruction extension, an extension adapter coupled to the processor and operable to detect the execution of the instruction extension, and programmable logic coupled to the extension adapter and operable to receive configuration data for defining the instruction extension and execute the instruction extension.

At least one long instruction word instruction may comprise at least two operations and control bits which may indicate the size of at least one long instruction word. Further, at least one long instruction word instruction may comprise a very long instruction word instruction.

The system may further comprise scoreboard circuitry configured to receive a first individual instruction, determine an age for a future register value based on the first individual instruction, and store the age within the scoreboard data structure and storage circuitry configured to store the scoreboard data structure.

The scoreboard circuitry may be further configured to decrement the age and store the decremented age in the scoreboard data structure. Moreover, the scoreboard circuitry may be further configured to receive a second individual instruction and retrieve the age for the future register value from the scoreboard data structure.

The scoreboard circuitry may also be configured to determine a write port characteristic for the future register value based on the first individual instruction and store the write port characteristic within the scoreboard data structure. Further, the scoreboard circuitry may be configured to receive a second individual instruction and retrieve the write port characteristic from the scoreboard data structure based on the second individual instruction. Moreover, the scoreboard circuitry may control a wide register file.

The system may further comprise a first register file in the processor operable to store first data, a second register file coupled to the programmable logic and the extension adapter and operable to store second data, and a load store module operable to transfer the first data using the first register file, transfer the second data using the second register file, and transfer the second data directly between the second register file and a system memory. The instruction extension specifies at least one input register in the second register file.

A method for adding reconfigurable computational instructions to a computer, the method comprising in a processor, executing a set of instructions of a computer program comprising a set of computational instructions and long instruction word instructions with at least one of the long instruction word instructions comprising an instruction extension, detecting the execution of the instruction extension in an extension adapter, receiving configuration data for defining the instruction extension into programmable logic, and executing the instruction extension in the programmable logic.

A software module comprising the software module operational when executed by a processor to direct the software module to execute a set of instructions of a computer program comprising a set of computational instructions and long instruction word instructions with at least one of the long instruction word instructions comprising an instruction extension, detect the execution of the instruction extension in an extension adapter, receive configuration data for defining the instruction extension into programmable logic, execute the instruction extension in the programmable logic, and a software module storage medium operational to store the module.

BRIEF DESCRIPTION OF THE DRAWINGS

FIG. 6 is an illustration of the sequence of processing unbundled individual instructions for the extensible processor system;

FIG. 7 is an illustration of the sequence of processing LIW instructions for the extensible processor system in one embodiment of the invention;

FIG. 13 illustrates an example of a scoreboard data structure in one embodiment of the invention;

DETAILED DESCRIPTION OF THE INVENTION

The embodiments discussed herein are illustrative of one example of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, these descriptions and drawings should not be considered in a limiting sense, as it is understood that the present invention is in no way limited to only the embodiments illustrated.

Figure 1:
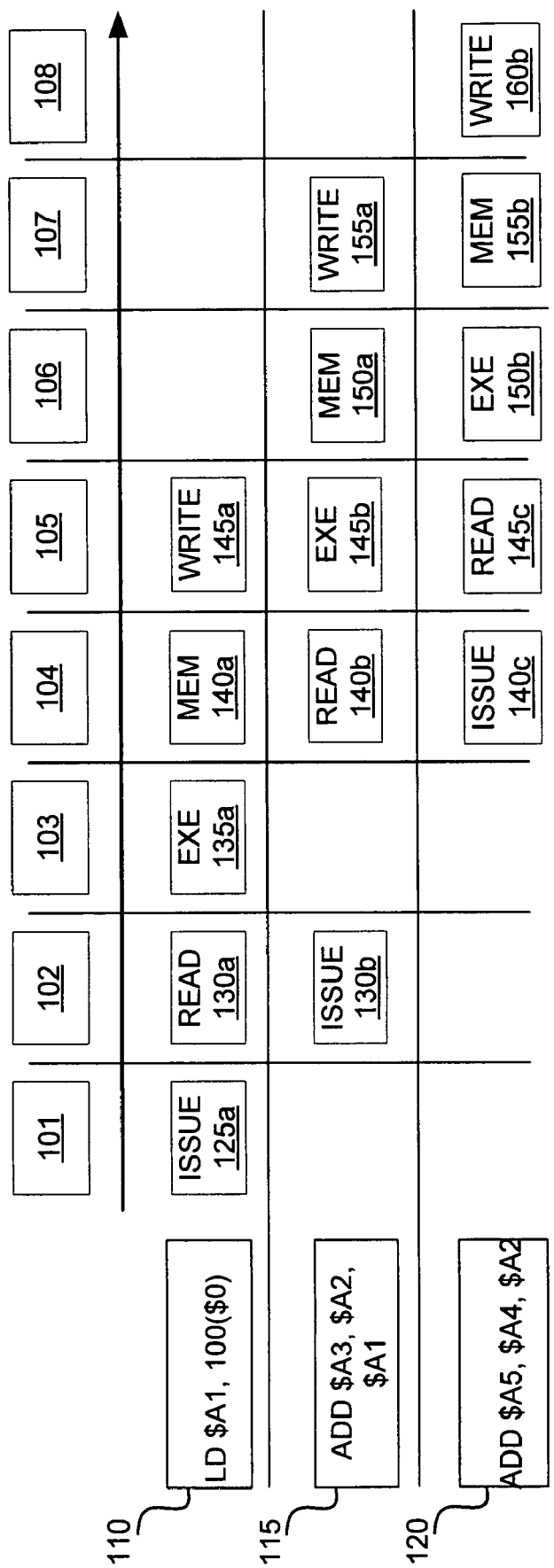
FIG. 1 is an illustration of a pipeline implementation with a five-stage instruction processor in the prior art.
Figure 2:
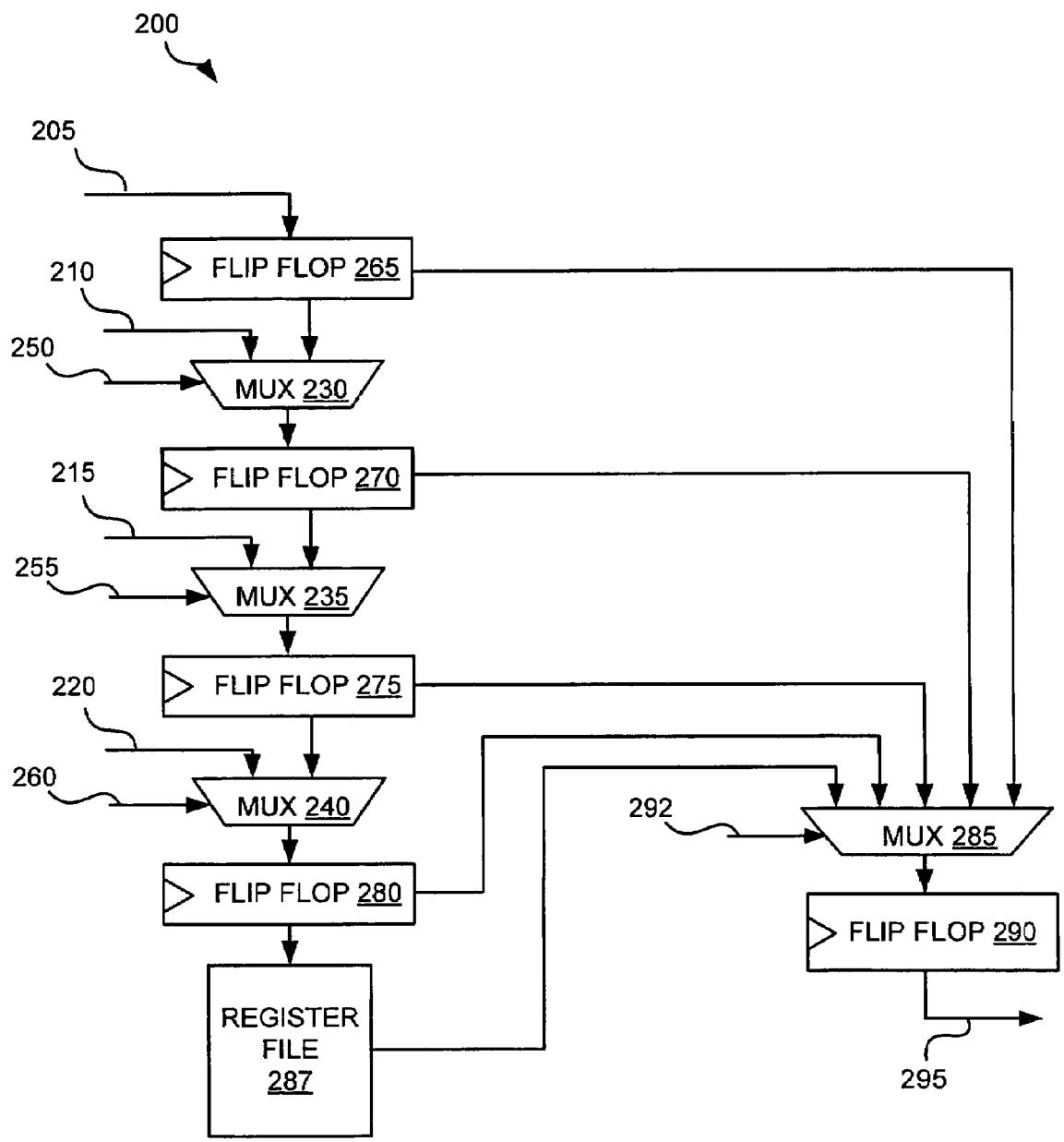
FIG. 2 is an illustration of a four-stage pipeline in the prior art.
Figure 3:
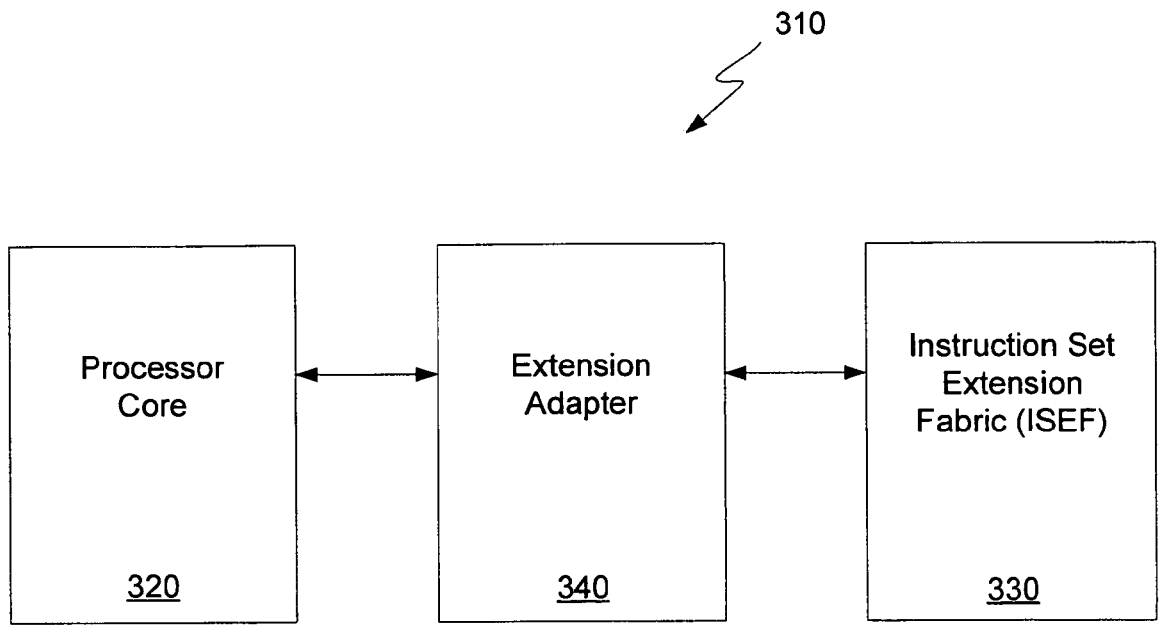
FIG. 3 is a schematic diagram of an extensible processor core system in one embodiment of the invention.

FIG. 3 is a schematic diagram of an extensible processor system 310 in one embodiment of the invention. The extensible processor system includes a processor core 320, an Instruction Set Extension Fabric (ISEF) 330, and an extension adapter 340 that couples the ISEF 330 to the processor core 320. The processor core 320 can include optional features such as LIW processors, scoreboard, scoreboard circuitry, coprocessors, write buffers, exception-handling features, debug handling features, read only memory (ROM), etc. The LIW processor can execute multiple individual operations within a single clock cycle. In one example, the LIW processor processes data within a register file which is controlled by a scoreboard (described below.) The processor core 320 provides standard processing capabilities such as a standard (native) instruction set that provides a set of instructions that the processor core 320 is designed to recognize and execute. Typical instructions include arithmetic functions such as add, subtract, and multiply, as well as load instructions, store instructions, and so forth. These instructions are hard-coded into the silicon and cannot be modified. One example of a suitable processor core 320 is the Xtensa® LX processor, from Tensilica, Inc., of Santa Clara, Calif.

Instruction Set Extension Fabric (ISEF) 330 includes programmable logic for enabling application-specific instructions ("instruction extensions") to be stored and executed. The Instruction Set Extension Fabric 330 is a type of programmable logic device. Because it is programmable, the instruction set of Instruction Set Extension Fabric 330 can be readily configured to include instruction extensions that are tailored to a specific application. In some embodiments, the programmable logic device (ISEF) 330 runs at a slower clock speed than processor core 320. In these embodiments, the cycle length of the programmable logic device 330 can be a multiple of the clock cycle of the processor core 320.

Extension adapter 340 provides an interface between the Instruction Set Extension Fabric 330 and the processor core 320. Extension adapter 340 receives instructions and determines whether the instructions should be directed to the Instruction Set Extension Fabric 330 or the processor core 320. In some embodiments, extension adapter 340 provides an interface between a plurality of Instruction Set Extension Fabrics 330 and processor cores 320. Extension adapter 340 can be implemented, for example, in Application Specific Integrated Circuit (ASIC) logic. In some embodiments, extension adapter 340 may be integrated within processor core 320 or ISEF 330.

Extension adapter 340 in combination with ISEF 330 provide logic that allows users to extend the native instruction set defined by the processor core 320. It is noteworthy that the extended instruction execution itself is implemented in one or more of Instruction Set Extension Fabrics 330. Extension adapter 340 interfaces one or more Instruction Set Extension Fabrics 330 to one or more processor core 320 and controls dataflow.

The extension adapter 340 and the ISEF 330 are described in further detail in U.S. patent application Ser. No. 10/732,392 titled "Reconfigurable Instruction Set Computing" filed Dec. 9, 2003. The extension adapter 340 is also described in further detail in U.S. patent application Ser. No. 10/404,706 titled "Extension Adapter" filed on Mar. 31, 2003. Each of these applications is hereby incorporated by reference herein.

Extension Adapter

Figure 4:
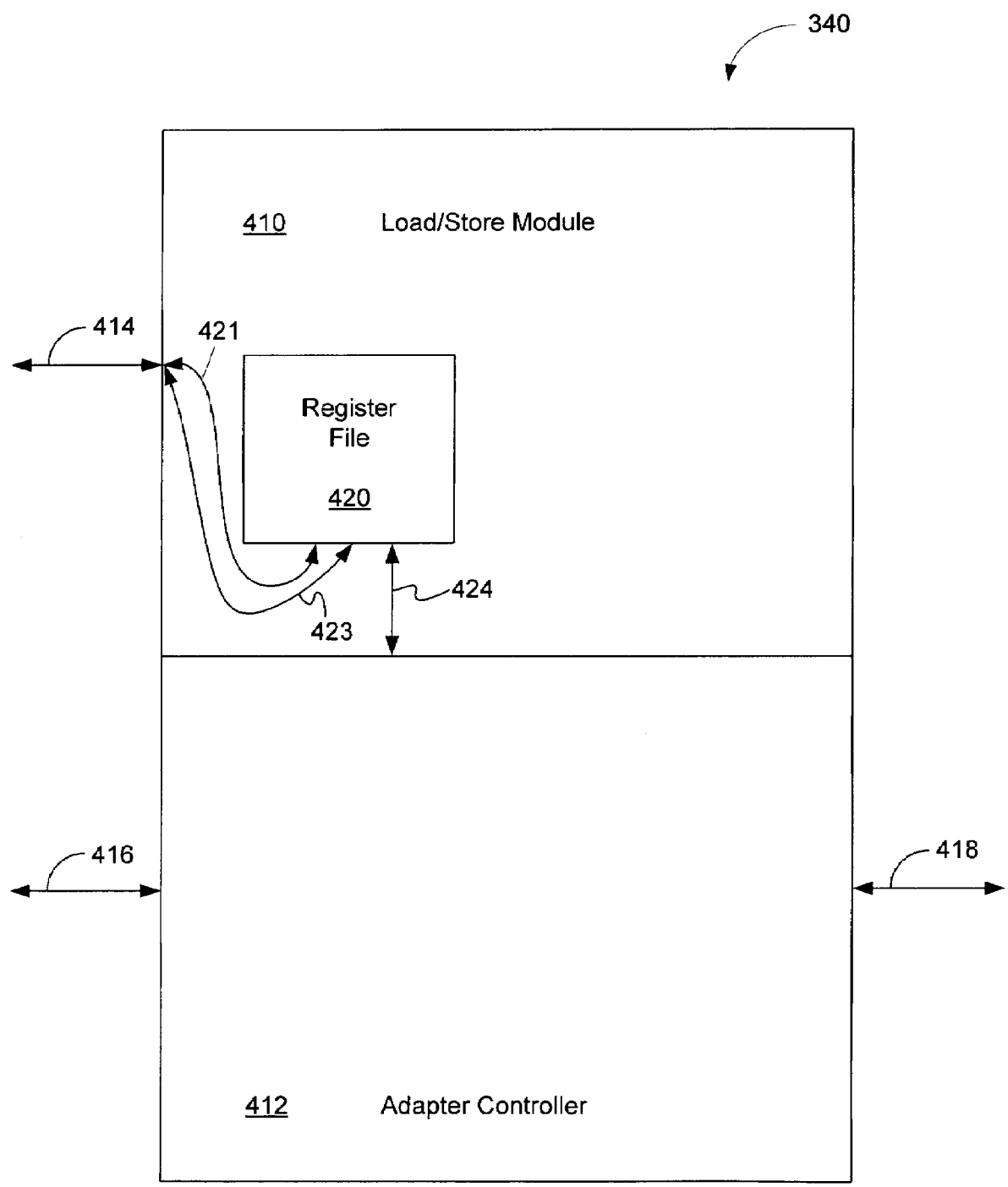
FIG. 4 is a schematic diagram illustrating details of the extension adapter of FIG. 3, in one embodiment of the invention.

FIG. 4 is a schematic diagram illustrating details of the extension adapter of FIG. 3, in one embodiment of the invention. Extension adapter 340 comprises load/store module 410 and adapter controller 412. In another embodiment, processor core 320, and not extension adapter 340, comprises load/store module 410.

Load/store module 410 can be created via a compiler, such as, for example, the Tensilica Instruction Extension (TIE) compiler, which can be obtained from Tensilica, Inc., of Santa Clara, Calif. TIE is a language that allows a user to describe the functionality of new extended instructions. A designer uses TIE to create a standard set of functions that extend the normal functionality of processor core 320. The TIE code that a designer writes describes the functionality of a series of resources that aid in the interface between processor core 320 and extension adapter 340. Extension adapter 340 functions such that processor core 320 treats user-defined post-silicon, extended instructions as if they were native instructions to the processor core 320. In some embodiments, the extended instruction includes at least one new instruction added post-silicon and a set of pre-silicon instructions.

Load/store module 410 interfaces with processor core 320 via interface 414. Register file 420 is coupled to interface 414 via processor control and data interface 421 and via ISEF control and data interface 423. Adapter controller 412 interfaces with processor core 320 via interface 416. Adapter controller 412 interfaces with ISEF 330 via interface 418.

In an exemplary embodiment according to the present invention, load/store module 410 comprises register file 420. Register file 420 is a register file, or collections of registers, that is added by using, for example, the TIE compiler. Register file 420 interfaces with adapter controller 412 via interface 424. In one embodiment, register file 420 is 128-bits wide. In another embodiment, register file 420 is 64-bits wide. However, register file 420 can be of varying widths. It is contemplated that the system can comprise one or more than one register file 420. Adapter controller 412 accesses register file 420. Adapter controller 412 is then used to interface with ISEF 330.

Load/store module 410 provides fixed instruction functionality. A set of fixed instructions includes instructions for moving data to and from external memory (not shown), into and out of register file 420. This collection of functionality is defined in one embodiment in the TIE language, and is implemented through Tensilica's TIE compiler. It is contemplated that languages other than TIE can be used with the present system. Load/store module 410 contains one or more register files 420 and a set of fixed instructions that give register files 420 access to external memory via load and store instructions. Again, these instructions will be fixed once the silicon is created, and are fully implemented using the standard TIE flow. It is a function of the extension adapter 340 to encapsulate the fixed functionality and manage it with the configurable interface logic.

A purpose of load/store module 410 includes defining the functionality of register file 420, which is temporary storage for data that is going to be transferred between processor core 320 and ISEF 330. Load/store module 410 defines not only register file 420, but also defines how to load and store generic instructions (e.g., Tensilica instructions) of processor core 320 into register file 420. Adapter controller 412 performs the function of interfacing with register file 420. Adapter controller 412 also receives the data from register file 420 and interfaces register file 420 with ISEF 330.

In one exemplary methodology, standard load and store instructions are used to move data to and from register file 420. Load instructions issued by the extension adapter 340 retrieve data from memory into register file 420. ISEF 330 instructions operate under the control of extension adapter 340 to retrieve stored data from register file 420 to ISEF 330 for use in ISEF 330 computations or other functional execution. Data resulting from ISEF 330 instruction execution is then returned to register file 420, where store instructions move data from register file 420 to memory via interface 414.

ISEF 330 and adapter controller 412 allow a user to add new instructions that change with software on different implementations of the same silicon. For example, a user can add specialized instructions to perform video or audio encoding/decoding. These instructions are not hard-wired into processor core 320, but rather are implemented using the programmably configurable logic of ISEF 330. Extension adapter 340 operates as a data and control interface between processor core 320 and ISEF 330 by routing extended instructions (i.e., those instructions not part of the original processor core 320 native instruction set) to ISEF 330 for execution. Since the logic of ISEF 330 is configurable, it is entirely within the scope of the present invention that the configuration of ISEF 330 can be changed as frequently as needed to accommodate the inclusion of various extended instructions in application programs being run on the processor core 320.

In one embodiment of the present invention, the inputs and outputs to the extended instruction, as executed in ISEF 330, are limited to data transfers between a named register file 420. In some embodiments, the ISEF 330 can access a register file in the processor core 320 to allow both reading and writing. In another embodiment, in addition to the data transfers between the named register file 420, the data transfers are between an alternative source indicative of a processor state. One example of this alternative source is a special purpose register. In such an embodiment, the number of register file 420 inputs to the ISEF 330 computation is a finite number such as three (3), and the number of special purpose register inputs is eight (8) 128-bit registers.

In some embodiments, the outputs of the ISEF 330 computations are directed to register file 420, to equivalent special purpose registers, and/or by-passed to processor core 320 for use in execution of the subsequent instruction. In the above embodiment, the number of register file 420 outputs is two (2) and the number is a 128-bit special purpose register outputs is up to eight (8). The extended instruction of such an embodiment does not have direct access to data and instruction memories and caches of the processor core 320. Any data residing in the data and instruction memories or caches of processor core 320 is first brought into the register file 420 using load instructions, before being used by the extended instruction as executed in ISEF 330. In some embodiments, the data residing in the data and instruction memories or caches of processor core 320 are brought into equivalent special purpose registers in addition to the register file 420 using load instructions. Such a restriction in the I/O of the extended instruction of this embodiment enables compiler optimization and improved performance. The exact input and output dependencies of the extended instructions are programmed into the C compiler used in scheduling the extended instruction and in allocating the associated register files 420.

It is noteworthy that extension adapter 340 handles the multiplexing of data among register file(s) 420 and ISEF 330. Extension adapter 340 manages the timing relationships between register reads and register writes, which are functions of instruction execution length.

It is also noteworthy that the extensible processor system 310 comprises means for ensuring the proper configuration of ISEF 330 prior to the execution of a specific extended instruction in the ISEF 330. In one example, if the system tries to execute an instruction not included in the instruction set of processor core 320 that is not currently configured in ISEF 330, an exception is generated by the extension adapter 340, resulting in either the proper configuration signals being sent to ISEF 330, or in an alternative process, being initiated to deal with the missing configuration.

Figure 5:
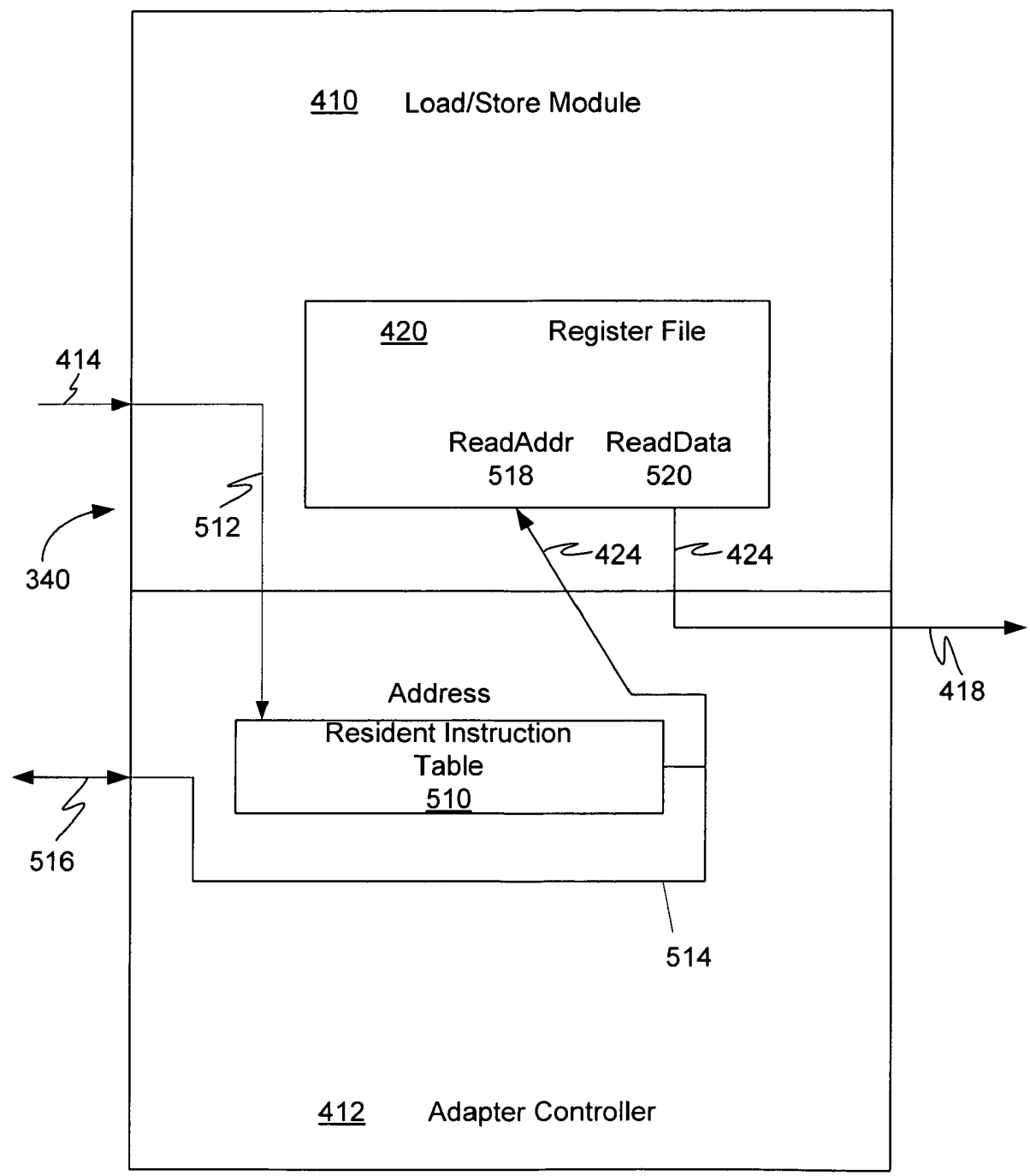
FIG. 5 is a schematic diagram illustrating an operation involving the reading of data in accordance with the extension adapter of FIG. 4 in one embodiment of the invention.

FIG. 5 is a schematic diagram illustrating an operation involving the reading of data in accordance with the extension adapter of FIG. 4 in one embodiment of the invention. Resident instruction table 510 has a description of what extended instructions are adapted to do with respect to the interface to processor core 320. For any instruction that a user creates, those instructions should control processor core 320 in such a way that processor core 320 executes those instructions in similar fashion to native instructions included in the original processor core 320 instruction set. Resident instruction table 510 receives instruction description data 512 (from interface 414 of FIG. 4) as a sequence of binary numbers (e.g., a 24-bit sequence) that is decoded by resident instruction table 510 and converted into an address that points to a location in resident instruction table 510.

If the instruction description data 512 describes a normal add, subtract, etc. contained in the native instruction set of processor core 320, then resident instruction table 510 does not do anything with the instruction. However, if the instruction description data 512 describes an extended instruction that ISEF 330 is to execute, then resident instruction table 510 returns configuration information 514 back to processor core 320 to indicate this is a valid instruction. Extension adapter 340 will thereafter operate on the extended instruction in cooperation with ISEF 330 so that to processor core 320 it appears that the extended instruction is identical in form to a native instruction of processor core 320.

Configuration information 514 is a sequence of data from resident instruction table 510, some of which goes to processor core 320 via configuration interface 516. Some of configuration information 514 is transmitted to the ReadAddr 518 (read address) input of register file 420 via interface 424. Data from ReadData 520 (read data) of a register file is also carried on interface 424. In this example, configuration information 514 includes the address within register file 420 that an extended instruction needs to be sent to ISEF 330 via interface 418.

LIW

LIW instructions may be implemented with the processor core 320 and the ISEF 330 to take advantage of parallel processing of multiple instructions. In an example, two operations may not have any dependencies between them and so may be processed in parallel. A compiler may bundle two operations or more within the LIW instruction. The compiler can sequentially compile LIW instructions as well as individual operations.

In an example, the compiler may bundle two or more operations for the processor core 320 or two or more operations for the ISEF 330 within one LIW instruction. The compiler may also bundle one operation for the processor core 320 and one operation for the ISEF 330 within one LIW instruction.

If the LIW instruction includes an operation for the ISEF 330, then the extension adapter 340 may detect the operation and send the operation to the ISEF 330 for processing. The processor core 320 may receive the portion of the LIW instruction for the processor core 320. The portion of the LIW instruction for the ISEF 330 and the portion of the LIW instruction for the processor core 320 may then be processed in parallel.

FIG. 6 is an illustration of the sequence of processing unbundled individual instructions 600-675 for the extensible processor system. Each individual instruction 600-675 is processed sequentially. Individual instructions 600, 605, 610, 620, 625, 635, 645, 650, 660, 665 and 675 are reduced instruction set computer (RISC) instructions. Individual instructions 615, 630, 640, 655, and 670 are ISEF instructions. In one example, assuming a five-stage processor without stalling, the 16 individual instructions 600-675 are processed within 20 clock cycles. (e.g. 5 clock cycles for the 5 stages of the first individual instruction+1 clock cycle for every other instruction=5 clock cycles+15 clock cycles=20 clock cycles.)

FIG. 7 is an illustration of the sequence of processing LIW instructions 700-790 for the extensible processor system in one embodiment of the invention. In this embodiment, the same individual instructions 600-675 from FIG. 6 are processed within a sequence of individual instructions 700, 710, 730, and 790, and LIW instructions 720 and 740-780. Where the compiler cannot find two suitable individual instructions to bundle, the processor core 320 will execute the individual instructions 700, 710, 730, and 790.

Even when individual instructions 700, 710, 730, and 790 cannot be bundled within LIW instructions, the sequence of instructions within FIG. 7 may process much faster than the same instructions within FIG. 6. In an example, assuming a five-stage processor, the 4 individual instructions 700, 710, 730, and 790 and 6 LIW instructions 720, and 740-780, are processed within 14 clock cycles. (e.g. 5 clock cycles for the 5 stages of the first individual instruction+1 clock cycle for every other instruction=5 clock cycles+9 clock cycles=14 clock cycles) Processing a combination of LIW instructions and individual instructions may be considerably faster than processing only individual instructions.

In order to process LIW instructions and take advantage of parallel processing, additional circuitry may be necessary. In one embodiment, the additional circuitry for processing the LIW instructions may comprise a pipeline. In another embodiment, the additional circuitry for processing the LIW instructions may comprise scoreboard circuitry. The scoreboard circuitry may operate a scoreboard data structure.

The scoreboard data structure may be used to control efficient LIW instruction processing with few hardware components. Scoreboard circuitry may operate the scoreboard data structure to increase the efficiency and speed of processing LIW and/or individual instructions. The processor core 320, one or more ISEFs 330, and one or more extended adapters 340 may comprise the scoreboard circuitry. The scoreboard circuitry may use the scoreboard data structure to track the availability of data within a register and to generate a control signal to stall the instruction based on the availability of data within the register.

Figure 8:
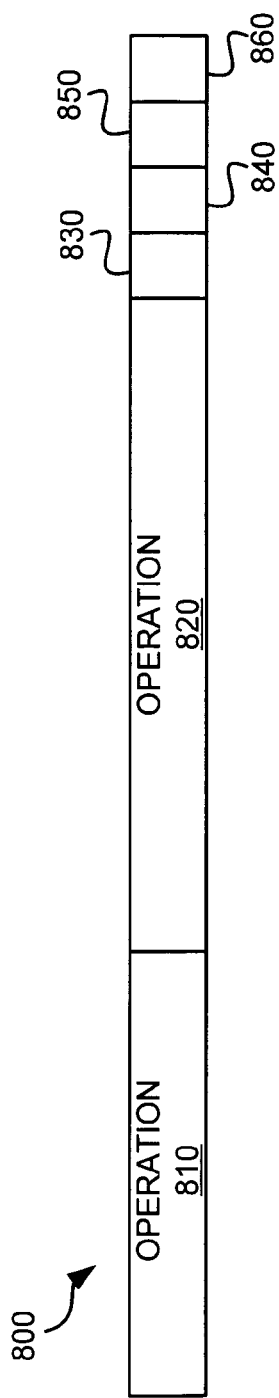
FIG. 8 is an illustration of a 64-bit LIW instruction in one embodiment of the invention.

FIG. 8 is an illustration of a 64-bit LIW instruction 800 in one embodiment of the invention. The compiler may bundle a 24-bit operation 810, a 36-bit operation 820 and four control bits 830, 840, 850, and 860 into a LIW instruction. The operation 810 and the operation 820 may each be an individual instruction that can be bundled by the compiler into a LIW instruction.

The control bits 830, 840, 850, and 860 may be used to indicate the size and format of the LIW instruction 800. In an example, if the control bits 830, 840, 850, and 860 are determined to equal a value from zero to seven, the LIW instruction 800 will be processed as a 24-bit LIW instruction 800. If the control bits 830, 840, 850, and 860 are determined to equal a value from eight to thirteen, then the LIW instruction 800 will be processed as a 16-bit LIW instruction 800. If the control bits 830, 840, 850, and 860 are determined to equal a value from fourteen to fifteen, then the LIW instruction 800 may be processed as a 64-bit LIW instruction 800.

Any size of operation may also be bundled to form the LIW instruction 800. The number of operations and the size of instructions to be bundled to form the LIW instruction 800 may be determined by the program to be executed, the programmer, the compiler, or constraints imposed by the processor core 320 or the ISEF 330. Further, although the four control bits 830, 840, 850, and 860 are each depicted as a single bit, the control bits 830, 840, 850, and 860 may be of any size.

In this embodiment, the LIW instruction 800 may be bundled by a compiler and run by the processor core 320. The extension adapter 340 may detect an ISEF 330 and operation and send the operation to an ISEF 330 for further processing. The ISEF 330 may contain custom instructions sets or additional instruction sets that are not available to the processor core 320. Therefore, operations within the LIW instruction 800 that are more complex may be processed by the ISEF 330. Similarly, the ISEF 330 may contain custom instruction sets that allow for efficient processing of certain repetitive functions. These repetitive functions may be bundled by the compiler into LIW instructions 800 and executed by the ISEF 330 for efficient parallel processing and faster performance.

Figure 9:
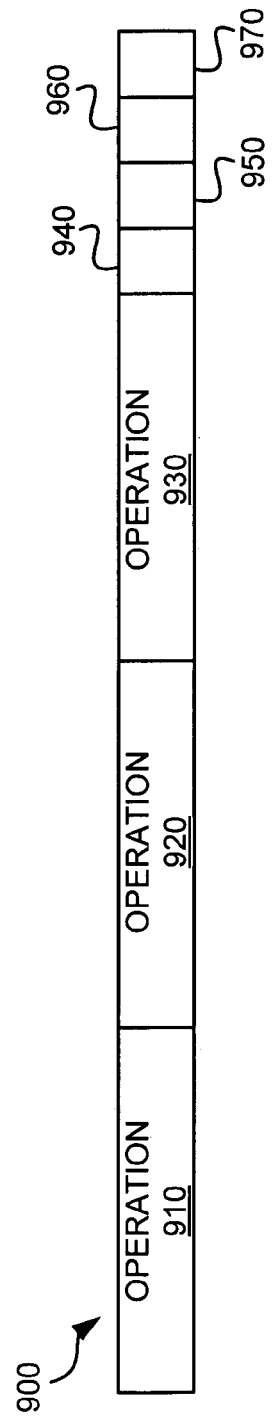
FIG. 9 is an illustration of another 64-bit LIW instruction in another embodiment of the invention.

FIG. 9 is an illustration of another 64-bit LIW 900 instruction in another embodiment of the invention. The compiler may bundle a 20-bit operation 910, a 20-bit operation 920, and a 20-bit operation 930 with four control bits 940, 950, 960, and 970.

Figure 10:
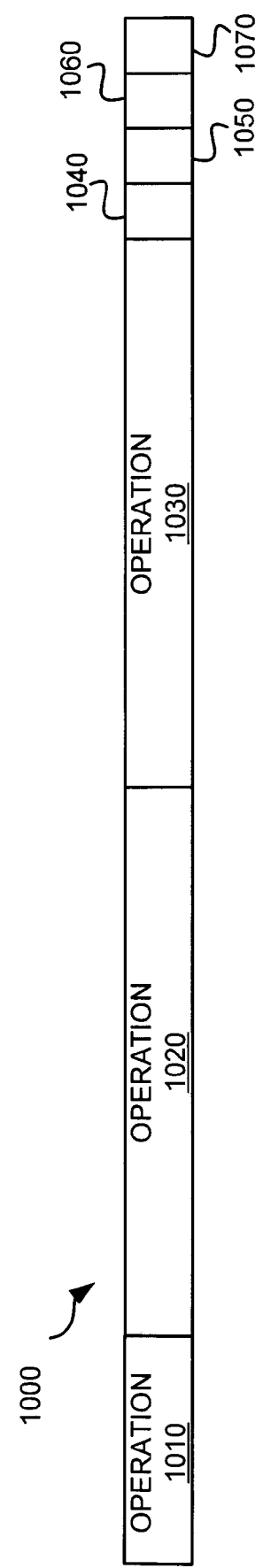
FIG. 10 is an illustration of a 96-bit LIW instruction in another embodiment of the invention.

FIG. 10 is an illustration of a 96-bit LIW instruction 1000 in another embodiment of the invention. The compiler may bundle a 20-bit operation 1010, a 36-bit operation 1020, a 36-bit operation 1030, with four control bits 1040, 1050, 1060, and 1070.

Figure 11:
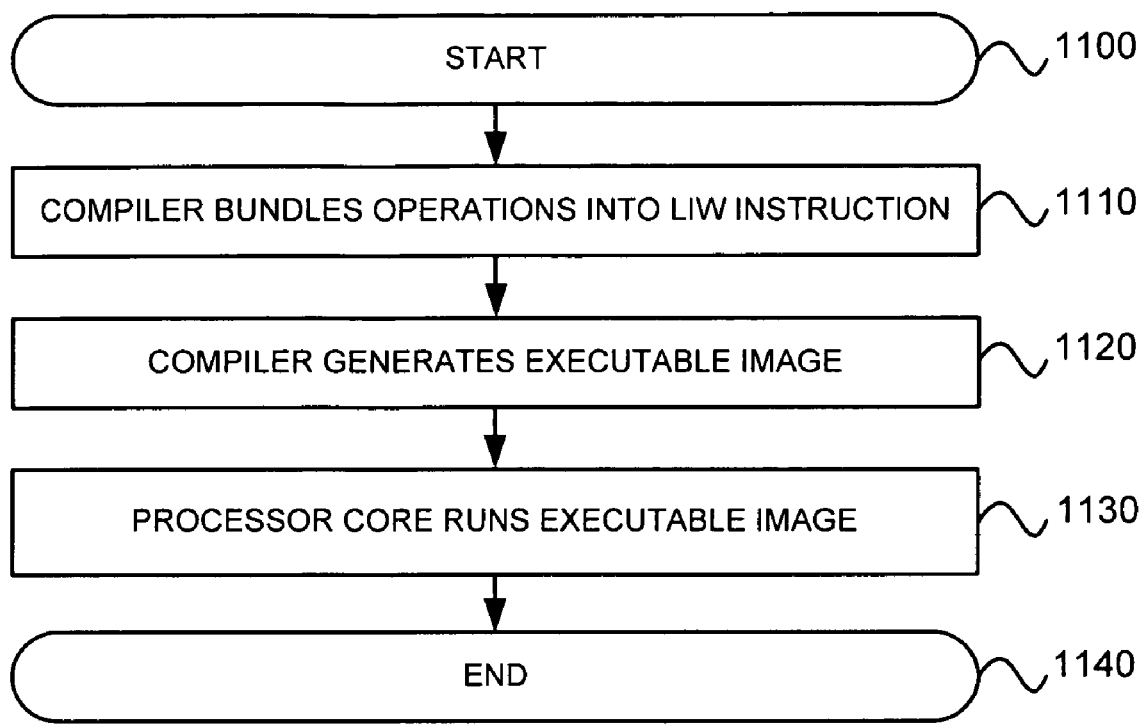
FIG. 11 is a flow chart depicting the processing of LIW instructions in one embodiment of the invention.

FIG. 11 is a flow chart depicting the processing of LIW instructions 1000 in one embodiment of the invention. FIG. 11 begins in step 1100. In step 1110, the compiler bundles operations to create the LIW instruction 1000. In an example, the compiler may review the dependencies within each operation and bundle only those operations that do not depend upon each other in order to take advantage of parallel processing. For example, if a first operation calculates the contents of register "A", then a second operation that uses the calculated contents of register "A" will not be bundled with the first operation. Otherwise, the second operation may be stalled before the second operation may be completed. As a result, the advantage of parallel processing may be lost.

In step 1120, the compiler generates an executable image of the LIW instruction 1000. In step 1130, the processor core 320 runs the executable image of the LIW instruction 1000. FIG. 11 ends in step 1140.

Figure 12:
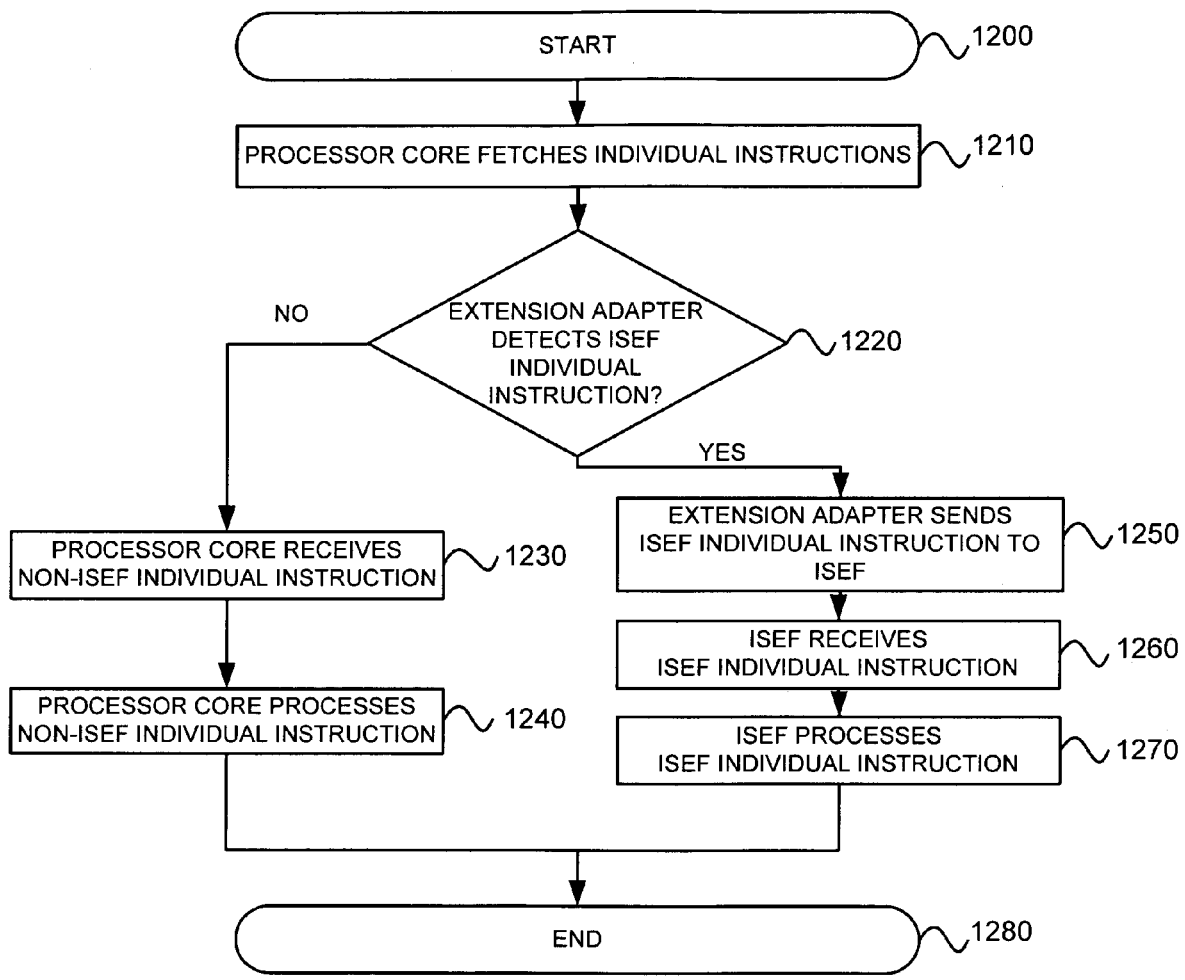
FIG. 12 is a flow chart depicting the processor core running an executable image in one embodiment of the invention.

FIG. 12 is a flow chart depicting the running of an executable image by the processor core 320 in one embodiment of the invention. FIG. 12 begins in step 1200. In step 1210, the processor core 320 fetches the instructions to process the operations contained within the LIW instruction 1000.

In step 1220, the extension adapter 340 may detect an instruction for the ISEF 330. If the extension adapter 340 does not detect the instruction, then the processor core 320 receives the instruction in step 1230.

In another embodiment, the processor core 320 receives only unbundled individual instructions. Each individual instruction is processed sequentially. If the extension adapter 340 detects an ISEF individual instruction in step 1220, the extension adapter 340 sends the ISEF individual instruction to the ISEF 330 in step 1250. If the extension adapter 340 does not detect an ISEF individual instruction, then the processor receives the non-ISEF individual instruction in step 1230. In this embodiment, FIG. 12 proceeds either to step 1230 or 1250 but not both in parallel.

In a further embodiment, the processor core 320 receives LIW instructions 1000. Each LIW instruction may be processed in parallel. If an LIW instruction 1000 comprises an ISEF individual instruction and a non-ISEF individual instruction, then the extension adapter 340 will detect the ISEF individual instruction in step 1220 and FIG. 12 will proceed to step 1230 and step 1250 in parallel.

In step 1230, the processor core 320 receives the non-ISEF individual instruction. In step 1240, the processor core 320 processes the non-ISEF individual instruction. The processor core 320 then continues to step 1280.

If the extension adapter 340 detects the ISEF individual instruction, then the extension adapter 340 sends the ISEF individual instruction to the ISEF 330 in step 1250. In step 1260, the ISEF 330 receives the ISEF individual instruction. In step 1270, the ISEF 330 processes the ISEF individual instruction. FIG. 12 ends in step 1280.

Scoreboard Data Structure

An age, stored within the scoreboard data structure, may be associated with each register. The age is any value that indicates when a future register value will be available within the respective register. The future register value is data that either is, or will be, written, stored, loaded, or saved to the register based on an instruction. The scoreboard circuitry may generate control signals that stall execution of the instruction based on the age. In one embodiment, the age of the associated register is a value which indicates the number of clock cycles when the future register value will be available in the register.

The scoreboard circuitry may also use the scoreboard data structure to enable write ports or access future register values even before the future register values are written to the associated registers. During processing, the write port may write the future register values to the associated register. A write port characteristic identifies the particular write port that will write the future register value to the associated register. The scoreboard data structure may store the write port characteristic. When the age of the associated register is "1", the write port may be preparing to write the future register value to the associated register. The scoreboard data structure may be used to enable the write port identified within the write port characteristic to write the future register value to the associated register. In another embodiment, the scoreboard circuitry uses the write port characteristic to retrieve the future register value directly from the identified write port.

FIG. 13 illustrates an example of a scoreboard data structure 1300 in one embodiment of the invention. While FIG. 13 illustrates the function of the scoreboard data structure 1300 in one embodiment, FIG. 16, described below herein, is an illustration of a hardware implementation of the scoreboard data structure 1300 in another embodiment of the invention.

The scoreboard data structure 1300 comprises rows of fields 1310a-f which may be respectively associated to registers (not depicted). Each row of fields 1310a-f comprises a register identifier ("REG. ID") field 1320a-f, an age field 1330a-f, and a write port field 1340a-f. Although there are 6 rows of fields 1310a-f depicted within FIG. 13, there may be many rows of fields 1310a-f for more registers. Alternatively, there may be fewer rows of fields 1310a-f for fewer registers.

The register identifier contained within the register identifier field 1320a identifies a particular register. An example of the register identifier includes a memory address for a particular register (e.g. a register pointer.) Since the order of the rows of fields 1310a-f may be related to respective registers, the register identifier fields 1320a-f are optional. Operations with the scoreboard data structure 1300 are described below in FIGS. 14, 15, and 18.

The age field 1330a contains the age of the future register value that will be contained within the register identified in the register identifier field 1320a. For example, if the age associated with the register is "0", then the future register value within the identified register is available. The age of "0" indicates that zero clock cycles are required until the future register value is available. If, however, the age associated with the identified register is "4", then the future register value within the register is not available. The age of "4" indicates that four clock cycles are required until the future register value within the register is available. The age of the associated register is decremented per clock cycle until, after four clock cycles, the age of the associated register is "0" which indicates that the future register value within the identified register is available. In another embodiment, the age of the associated register is decremented every two or more clock cycles.

It will be appreciated by those skilled in the art that the age of "0" to indicate the availability of the future register value is arbitrary. Any number may be chosen to indicate that the future register value is available. In another example, the age within the age field 1330a may be incremented until a predetermined target age is reached to indicate that the future register value is available.

The write port field 1340a contains a write port characteristic identifying the particular write port within the register file. In an example, the write port characteristic identifies which write port will supply the future register value to the associated register within the register file. The register file may be a wide register file. The wide register file is a multiple-entry register file with a wide data path that acts as the mechanism by which data is transferred between ISEF instructions and available data memories. Data memories may include, but are not limited to, data cache, single-port data RAM, and external DRAM. In another embodiment, the wide register file may act as the mechanism by which data is transferred between processor instructions and available data memories.

Those skilled in the art will appreciate that the scoreboard data structure 1300 may be oriented in many ways including orthogonally where the rows of fields 1310a-f appear as columns. Further, many fields may be present within the scoreboard data structure 1300. For example, an active function field may be added to the scoreboard data structure 1300 that tracks when specific functional components are busy or when functional components are free to execute new data thereby allowing the scoreboard circuitry to consider more information when calculating the age for the age field. Although the scoreboard data structure 1300 is depicted within FIG. 13 as a table, the scoreboard data structure 1300 may be any data structure, including, but not limited to, one or more of the following: a linked list, array, delimited field, stack, queue, or database.

The scoreboard circuitry for operating the scoreboard data structure 1300 may be implemented as a software module. The scoreboard circuitry may be stored within the extension adapter 340 or the processor. The scoreboard circuitry may control the scoreboard data structure, perform age and write port calculations, and control the wide register file (described herein). Storage circuitry, which can be configured to store the scoreboard data structure 1300, may be located within scoreboard circuitry, the extension adapter 340, or the processor core 320. The storage circuitry may comprise RAM or other memory device.

Figure 14:
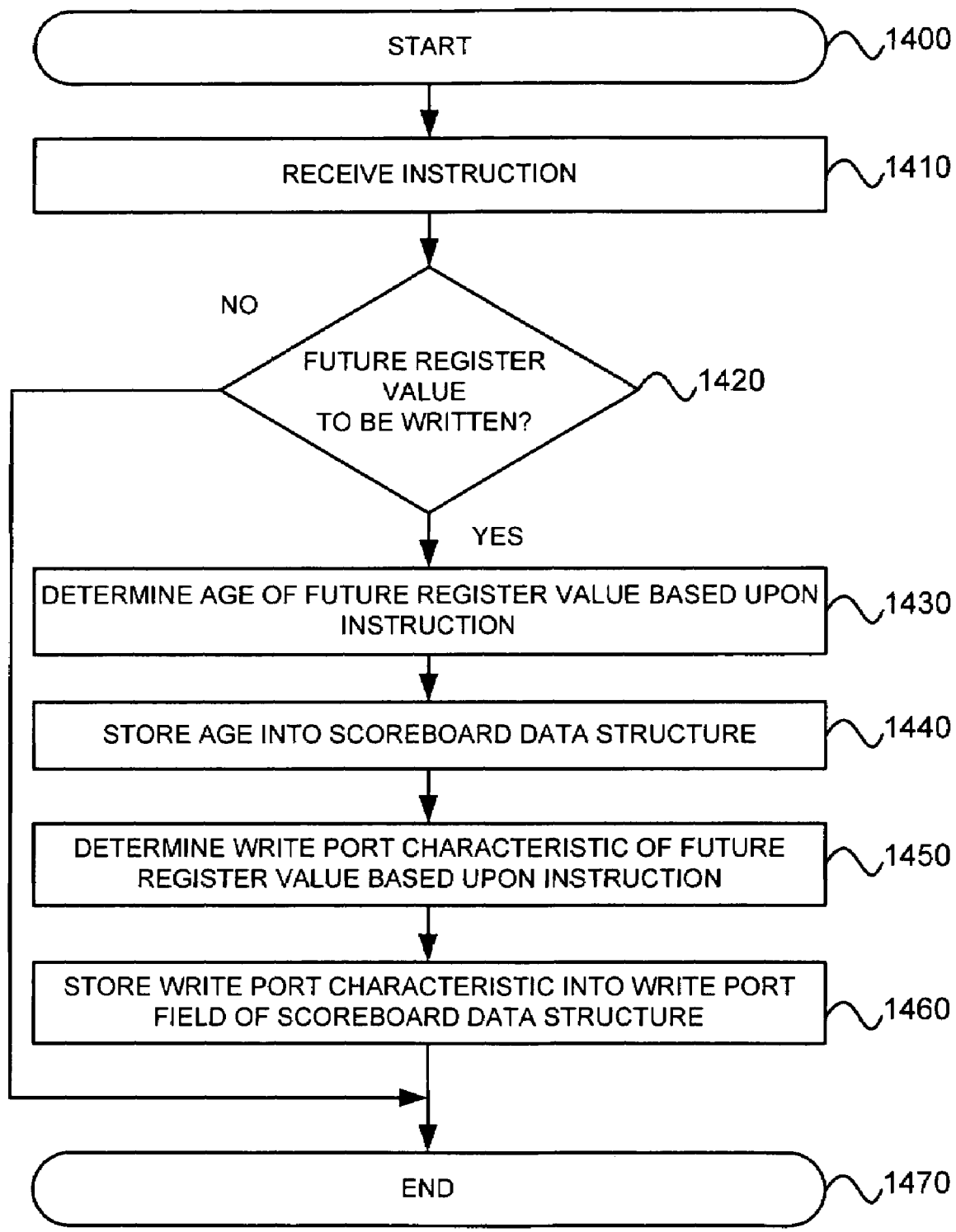
FIG. 14 is a flow chart illustrating the storing of the age and the write port characteristic to the scoreboard data structure in one embodiment of the invention.

FIG. 14 is a flow chart illustrating the storing of the age and the write port characteristic to the scoreboard data structure 1300 in one embodiment of the invention. FIG. 14 begins in step 1400. In step 1410, scoreboard circuitry receives an instruction. In step 1420, the scoreboard circuitry determines if the instruction contains a command to write the future register value to the register. In an example, the scoreboard circuitry may receive an instruction and determine that the instruction includes a command to add two values and write the sum within register "A". By determining if the instruction contains a command to write the future register value to the register, the scoreboard circuitry is determining if the instruction contains a command to write, save, store, or otherwise load the future register value to the register. If the instruction contains a command to write to the register, then the scoreboard circuitry proceeds to step 1430. If the instruction does not contain a command to write to the register, then the scoreboard circuitry proceeds to step 1470.

In step 1430, the scoreboard circuitry determines the age of the future register value based upon the instruction. In one example, the scoreboard circuitry, based on the instruction, may determine the number of clock cycles required to execute the instruction and write the future register value to the register. For example, the scoreboard circuitry may receive an instruction to place the sum of the contents of register "A" and register "B" within register "C". Assuming that the scoreboard circuitry includes a five-stage processor, the scoreboard circuitry may determine that the future register value of register "C" will be available within five clock cycles based upon this instruction. Therefore, the age of the future register value is "5".

In another example, the scoreboard circuitry may determine the age of the future register value based upon the time necessary to process the instruction as well as the age of the registers the instruction depends upon. For example, the scoreboard circuitry may receive an instruction to subtract the contents of register "A" from register "B" and place the result within register "C". Similar to the previous example, based upon the instruction and the five-stage processor, the scoreboard circuitry may determine that the future register value of register "C" will be available within five clock cycles. However, the scoreboard circuitry may also determine that the future register value of register "A" has an age of "3" and therefore the future register value of register "A" may not be available for execution for three clock cycles. As a result, the scoreboard circuitry may determine that the age of the future register value is "8" which indicates that the future register value will not be available within register "C" for 8 clock cycles.

In a further example, the scoreboard circuitry may determine the age of the future register value based upon the time necessary to process the instruction, the age of the registers the instruction depends upon, and the number of stages of the processor. For example, the processor may receive an instruction to add the contents of register "D" to register "E" and to place the result within register "F". However, the future register value of register "E" may not be available for three clock cycles. The "E" register, therefore, has an age of "3". Assuming the five-stage processor, the scoreboard circuitry may calculate that the instruction may first be "issued" within the first clock cycle. At the end of the first clock cycle, the "E" register would have the age of "2". In the second clock cycle, the registers of the instruction will be read. However, the age of the "E" register will be "2" which indicates that the future register value within the "E" register may not be available for two more clock cycles. The scoreboard circuitry will determine that, based on the instruction and the availability of the "E" register, the age of the result within the "F" register is "7" (5 stages+2 stalls for the "E" register).

In step 1440, the scoreboard circuitry stores the age within the scoreboard data structure 1300 in age field 1330a which is associated to the register identified within the register identifier field 1320a. In step 1450, the scoreboard circuitry determines the write port characteristic of the future register value based upon the instruction. The write port characteristic identifies the write port which will write the future register value to the register identified within the register identifier field 1320a. In step 1460, the scoreboard circuitry stores the write port characteristic within the scoreboard data structure 1300 in the write port field 1340a. FIG. 14 ends in step 1470.

Figure 15:
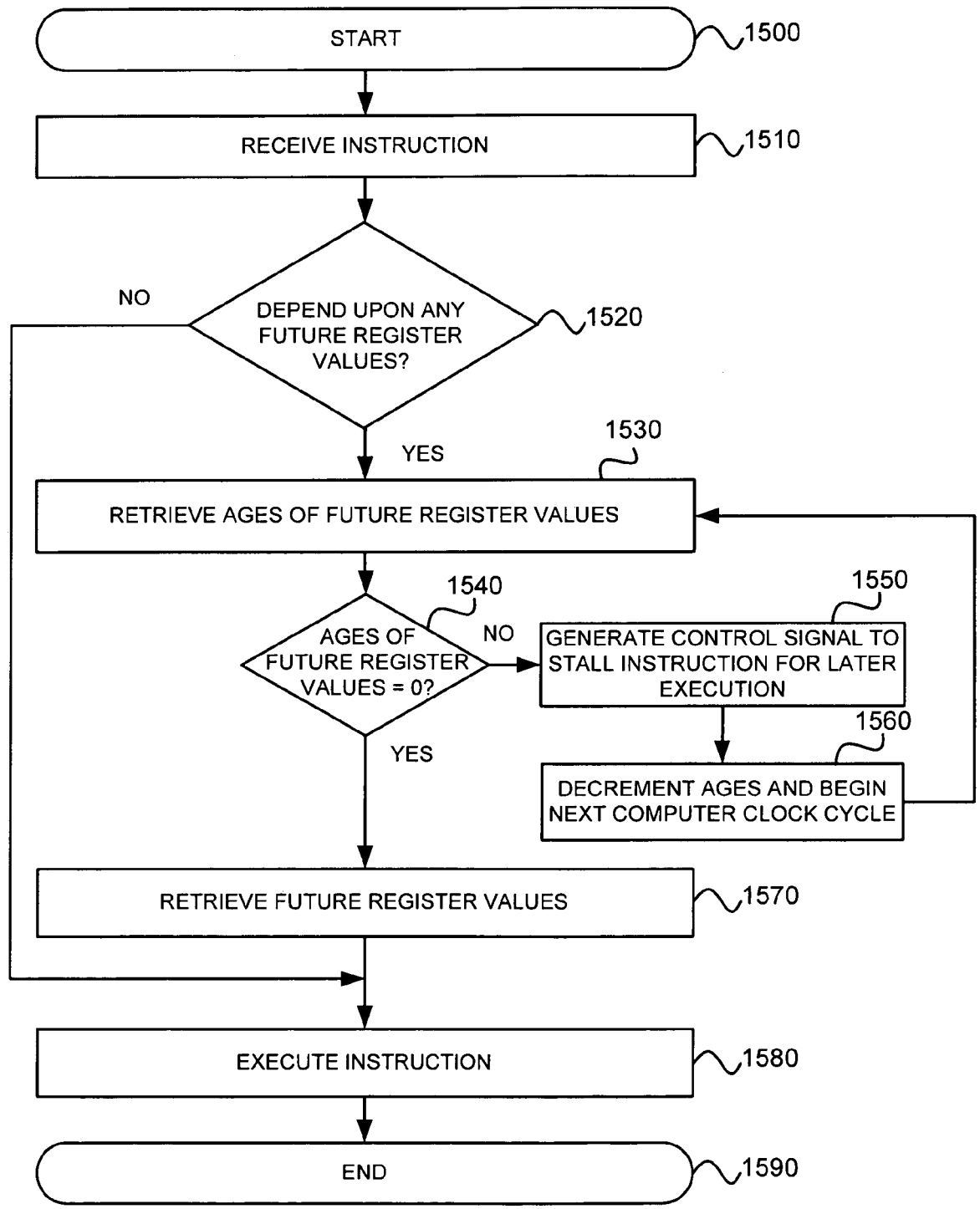
FIG. 15 is a flow chart illustrating the retrieval of the age and the write port characteristic from within the scoreboard data structure to determine a timing for instruction execution in one embodiment of the invention.

FIG. 15 is a flow chart illustrating the retrieval of the age and the write port characteristic from within the scoreboard data structure 1300 to determine a timing for instruction execution in one embodiment of the invention. FIG. 15 begins in step 1500. In step 1510, the scoreboard circuitry receives an instruction. In this embodiment, the instruction received by the scoreboard circuitry may be the first instruction to be processed, the second instruction to be processed, or any instruction within a series of instructions.

In step 1520, the scoreboard circuitry determines if the instruction depends upon any future register value in order to be processed. For example, if the scoreboard circuitry received the instruction to add the value of "100" to the future register value of register "T", then the instruction depends upon the future register value of register "T". If the scoreboard circuitry determines that the instruction does not depend upon the future register value, then the scoreboard circuitry proceeds to step 1580. In another embodiment, the instruction may depend upon multiple future register values. For example, the instruction may command to add the future register of "X" to the future register value of "Y". As a result, the instruction depends upon two future register values. If the scoreboard circuitry determines that the instruction depends upon any future register values, then the scoreboard circuitry proceeds to step 1530.

In step 1530, the scoreboard circuitry retrieves the ages of all of the future register values from the age fields 1330a-f associated with the registers that may hold the future registry values referenced in the instruction. The age fields 1330a-f may be within the rows of fields 1310a-f associated with the registers referenced in the instruction.

In step 1540, the scoreboard circuitry determines if the retrieved ages of the future register values are "0". In this embodiment, when the ages of the future register values are "0", the future register values within the registers associated with the ages are available. If all of the retrieved ages of the future register values are "0" then the scoreboard circuitry proceeds to step 1570. If the scoreboard circuitry determines that the retrieved ages for any of the future register values are not "0", then the scoreboard circuitry proceeds to step 1550.

In step 1550, the scoreboard circuitry generates a control signal to stall the instruction for later execution. In an example, if the scoreboard circuitry determines that the age of the future register value of register "T" is not "0" and that the instruction depends upon the future register value of register "T", then the instruction may be stalled. In step 1560, the scoreboard circuitry decrements all of the ages that are not "0" and the next clock cycle begins. In an example, the age is decremented and stored within the age field 1330a. In this embodiment, the age is decremented until the value of the age is "0". The scoreboard circuitry proceeds to step 1530 where the ages of the future register values are again retrieved from the age fields 1330a-f.

In step 1570, the scoreboard circuitry retrieves the future register values. For example, once the age of the future register value of register "T" is "0", then the scoreboard circuitry retrieves the future register value of register "T". In another embodiment, the instruction may depend on two or more future register values. Once the ages of all of the future register values are "0", then the scoreboard circuitry retrieves all of the future register values. In step 1580, the processor executes the instruction. FIG. 15 ends in step 1590.

Figure 16:
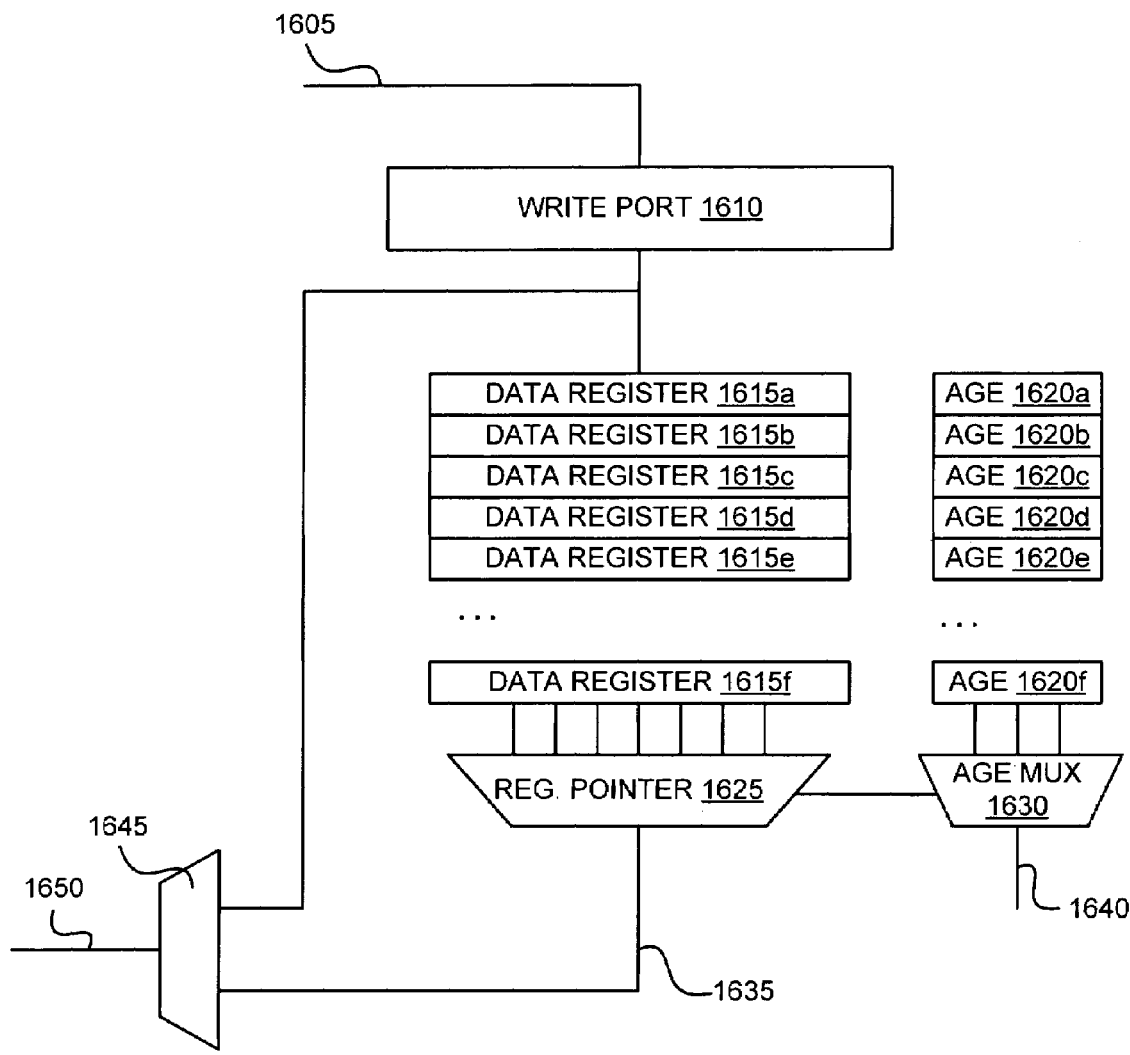
FIG. 16 is an illustration of a hardware implementation of the scoreboard data structure in one embodiment of the invention.

FIG. 16 is an illustration of a hardware implementation of the scoreboard data structure 1300 in one embodiment of the invention. Register write data travels from a processor core 320, ISEF 330, register or other memory device (not depicted) over signal path 1605 into the write port 1610. Write port 1610 is coupled to both a result multiplexer 1645 and data registers 1615a-f. Each data register 1615a-f is associated with an age 1620a-f, respectively. Each data register 1615a-f is coupled to a register pointer multiplexer ("REG. POINTER") 1625. Similarly, the age 1620a-f is also coupled to an age multiplexer ("AGE MUX") 1630. The age multiplexer 1630 is coupled to the register pointer multiplexer 1625 and the signal path 1640 which may also be coupled to a processor, ISEF 330, register, or other memory device (not depicted). The register pointer multiplexer 1625 is also coupled to the result multiplexer 1645, which sends the result through the signal path 1650 to the processor core 320, ISEF 330, register or other memory device (not depicted).

Although only one signal path 1605 and only one write port 1610 is depicted within FIG. 16, there may be many signal paths 1605 each going to a separate write port 1610 which are each coupled to the data registers 1615a-f and the results multiplexer 1645. Although six data registers 1615a-f and six ages 1620a-f are depicted in FIG. 16, any number of data registers 1615a-f and age 1620a-f may be used. In another embodiment, there may be a write port characteristic associated with every data register 1615a-f.

In one embodiment, the write port 1610 may be replaced with an ancillary or temporary register (not depicted.) In another embodiment, the data registers 1615a-f, the ages 1620a-f, the register pointer 1625 and the age multiplexer 1630 may represent the scoreboard. The scoreboard circuitry may control the data flow based on the age 1620a-f. The scoreboard circuitry control of the data flow is not depicted in FIG. 16, however, the scoreboard circuitry may control the results multiplexer 1645 based on the age 1620a-f.

In an example, if an instruction depends on the future register value from data register 1615b, the scoreboard circuitry may retrieve the memory address from data register 1615b as well as the age 1620b. If the age 1620b is not "0", then the scoreboard circuitry may block signal path 1635 by controlling the results multiplexer 1645 until the data register 1615b and the age 1620b may be retrieved and re-evaluated in the next clock cycle.

It is appreciated that the future register value need not be retrieve from data registers 1615a-f but may also be retrieved from the write port 1610. In an example, the scoreboard circuitry may direct the result multiplexer 1645 to receive the future register value directly from the write port 1610. The scoreboard circuitry may base a determination to receive the future register value from the write port 1610 upon a write port field (not depicted) within the scoreboard.

Figure 17:
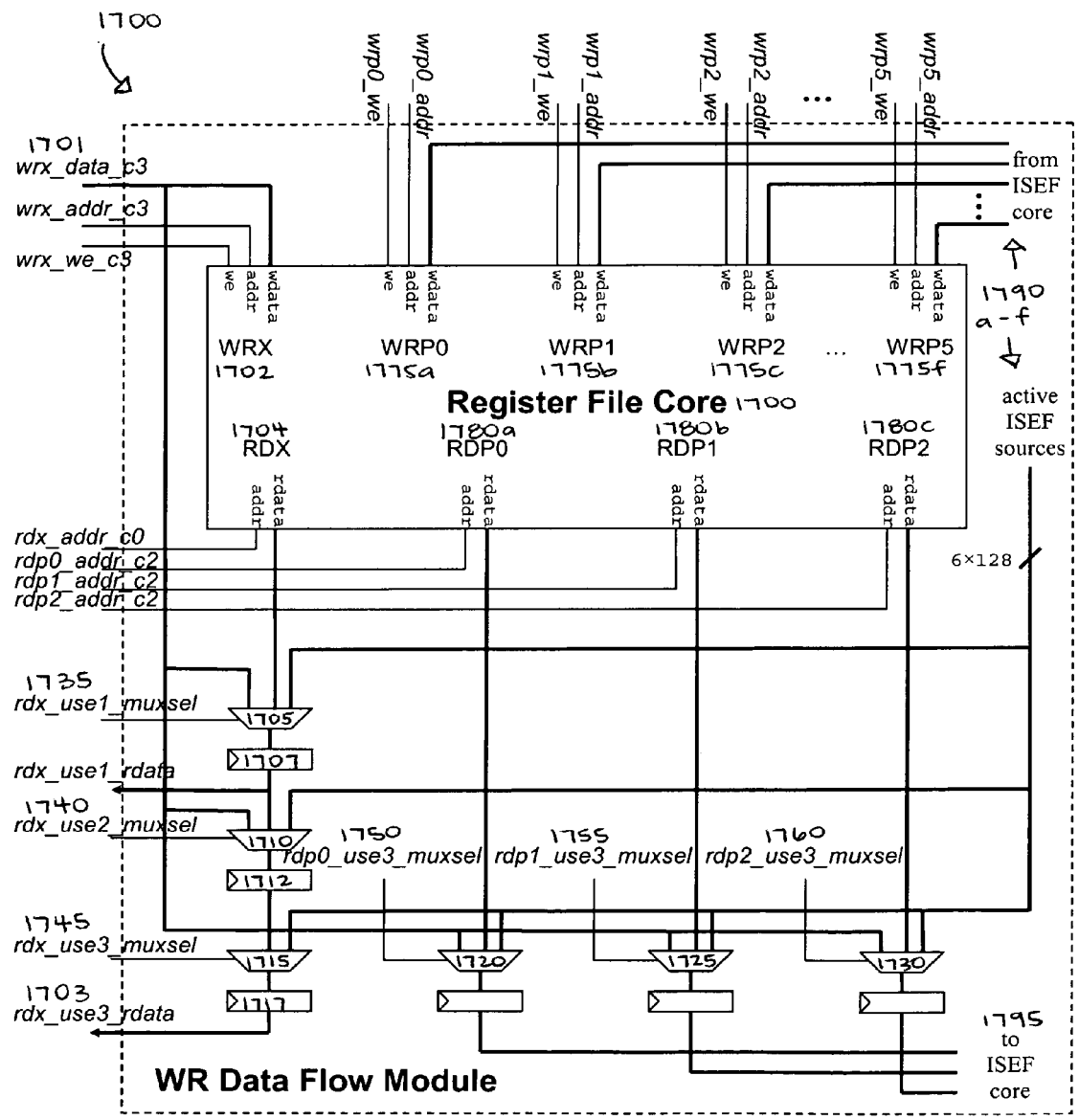
FIG. 17 is an illustration of the wide register file in one embodiment of the invention.

FIG. 17 is an illustration of the wide register file 1700 in one embodiment of the invention. The wide register file 1700 is a single 128-bit wide register file that communicates with a processor core (not depicted) as well as an ISEF (not depicted) and acts as a mechanism by which data is transferred between ISEF instructions and available data memories (not depicted.) The scoreboard circuitry (not depicted) may control the wide register file 1700. Scoreboard circuitry may also control the scoreboard data structure, the implementation of instruction stalls, and other control logic within the wide register file 1700.

The wide register file 1700 comprises a register file core 1770. The register file core 1770 is a 32-entry register file core with one processor write port 1702, six ISEF write ports 1775a-f for simultaneous ISEF writes, one processor read port 1704 for processor reads, three ISEF read ports 1780a-c for ISEF reads, and one or more registers (not depicted).

The register file core 1770 is coupled to multiplexer 1705 in this embodiment. Multiplexers 1705, 1710, 1715, and flip flops 1707, 1712, and 1717 form a three-stage pipeline for the processor core. In this embodiment, multiplexers 1705 and 1710 each have eight inputs. Multiplexer 1705 has six inputs from ISEF sources 1790a-f, an input from the processor read port 1704, and an input from the processor write path 1701. Multiplexer 1710 has six inputs from ISEF sources 1790a-f, an input from the processor write path 1701, and an input from flip flop 1707. Multiplexer 1715 has seven inputs including six inputs from ISEF sources 1790a-f, and an input from flip flop 1712. Data flows through the combination of multiplexer 1705 and flip flop 1707, multiplexer 1710 and flip flop 1712, or multiplexer 1715 and flip flop 1717 every clock cycle.

Multiplexer 1715 controls the data flow to the processor core. In this embodiment, the scoreboard circuitry controls the control signals 1735, 1740, and 1745 of each of the multiplexers 1705, 1710, and 1715, respectively.

Each read port 1780a-c within the register file core 1770 is also coupled to multiplexers 1720, 1725, and 1730, respectively, which control the flow of data to the signal path 1795 that leads to the ISEF. The scoreboard circuitry that controls the scoreboard data structure may also control the control signals 1750, 1755, and 1760 of each of the multiplexers 1720, 1725, and 1730, respectively. Each multiplexer 1720, 1725, and 1730 has eight inputs. Multiplexer 1720 has six inputs from ISEF sources 1790a-f, an input from the ISEF read port 1780a, and an input from the processor write path 1701. Multiplexer 1725 has six inputs from ISEF sources 1790a-f, an input from the ISEF read port 1780b, and an input from the processor write path 1701. Multiplexer 1730 has six inputs from ISEF sources 1790a-f, an input from the ISEF read port 1780c, and an input from the processor write path 1701.

Each write port 1775a-f may receive data from the ISEF sources 1790a-f. Each write port 1775a-f may operate simultaneously and independently from the other write ports 1775a-f. Further, each write port 1775a-f may write to any register located within the register file core 1770.

In this embodiment, each write port 1775a-f may be independently enabled by the scoreboard logic. The write port 1775a is enabled when the scoreboard circuitry directs the write port 1775a to write data from the ISEF source 1790a to the register (not depicted) within the register file core 1770.

In another embodiment, the scoreboard circuitry may further direct the ISEF sources 1790a-f to bypass the write ports 1775a-f and write data directly to the multiplexers 1705, 1710, and 1715 for later use by the processor core. Although the data may write directly to multiplexers 1705, 1710, and 1715, the data is still written to the register in the register file core 1770. In an example, the scoreboard circuitry may direct the ISEF source 1790a to write data directly to multiplexer 1705. Subsequently, multiplexer 1705 receives the data. Simultaneously, the data is received by the write port 1775a which is enabled to write the data to the register in the register file core 1770.

The register file core 1770 may comprise any number of ISEF write ports 1775a-f, any number of ISEF read ports 1780a-c, any number of processor write ports 1702, any number of processor read ports 1704, and any number of registers. Similarly, there may be any number of ISEF sources 1790a-f.

In the embodiment depicted in FIG. 17, the scoreboard circuitry is used to control the wide register file 1700 to eliminate the need for numerous hardware components such as additional registers, multiplexers and flip flops. The ISEF, in this embodiment, has 32-stages. For example, as discussed herein, a pipeline approach to implement a 32-stage processor without a scoreboard data structure may require 11,170 registers. With the scoreboard logic using a scoreboard data structure, the number of registers is equal to:

$$\text{Number of registers} = (\text{number of stages}) \times (\text{bit width and age}) + \text{scoreboard staging registers.}$$
$$= (32) \times (133) + 768$$
$$= 5,024$$

The system of FIG. 17 may have only three stages. The number of registers increases as the number of stages increase. Since the hardware requirements for a 3-stage processor are more limited, a pipeline comprising multiplexers 1705, 1710, 1715 and flip flops 1707, 1712, and 1717 is implemented.

Figure 18:
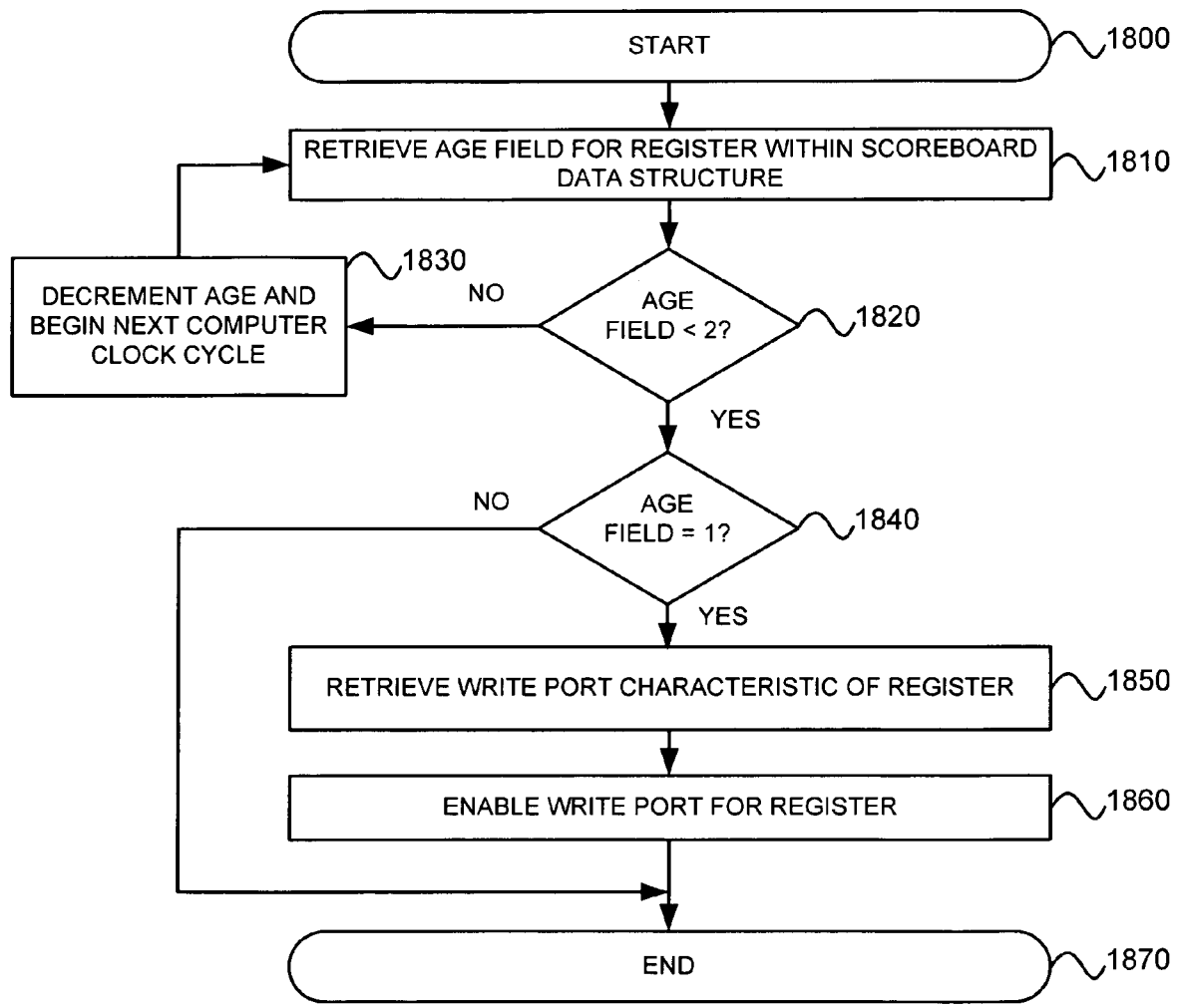
FIG. 18 is a flowchart illustrating the enablement of the write port to write a future register value to a register in one embodiment of the invention.

FIG. 18 is a flowchart illustrating the enablement of the write port to write a future register value to a register in one embodiment of the invention. FIG. 18 begins in step 1800. In step 1810, the scoreboard circuitry retrieves the age from the age field 1330a within the scoreboard data structure 1300. In step 1820, the scoreboard circuitry determines if the age within the age field 1330a is less than "2". If the age within the age field 1330a is less than "2", the scoreboard circuitry proceeds to step 1840. If the age within the age field 1330a is not less than "2", the scoreboard circuitry proceeds to step 1830.

In step 1830, the scoreboard circuitry decrements the age within the age field 1330a and the next clock cycle begins. The scoreboard circuitry proceeds to step 1810.

In step 1840, the scoreboard circuitry determines if the age within the age field 1330a is "1". If the age within the age field 1330a is not "1", then the scoreboard circuitry proceeds to step 1870. If the scoreboard circuitry determines that the age within the age field 1330a is "1", the scoreboard circuitry retrieves the write port characteristic from the write port field 1340a associated with the register in step 1850.

In step 1860, the scoreboard circuitry enables the write port for the associated register. The scoreboard circuitry enables the write port based upon the write port identified within the write port characteristic. In an example, the scoreboard circuitry may enable the write port to write the future register value to the identified register. In another example, the scoreboard circuitry may enable the write port to send the future register value directly to the processor for processing another instruction. FIG. 18 ends in step 1870.

The scoreboard data structure 1300 may have significant advantages over the pipeline approach. The scoreboard data structure 1300 approach may have far fewer hardware components than the pipeline approach. As discussed above, a 32-stage pipeline may require as many as 11,170 registers while a 32-stage scoreboard data structure 1300 and accompanying scoreboard circuitry may only require 5,024 registers, which reduces the costs of components. Further, reduced registers save on precious area and space within a chip.

Further, when using the scoreboard data structure 1300, future register values may be written to the register file one clock cycle after the future register values have been generated. In another embodiment, the age field 1330a, the register identifier field 1320a, and the write port field 1340a within the scoreboard data structure 1300 are not populated until the associated future register value is committed. In this embodiment, the future register value may be written to the register file once the fields of the scoreboard data structure 1300 are populated and the future register value is available (e.g. the age within the age field 1330a associated with the future register value is "0".)

In the pipeline approach, future register values that are immediately available may pass through numerous hardware components and clock cycles before being written to the register. One of the reasons future register values may be required to pass through numerous hardware components in the pipeline approach is that some future register values may not be committed until a later clock cycle. As a result, the future register values are held within the hardware components.

With more registers and circuitry necessary to stall instructions, the pipeline approach is much more complex than the scoreboard data structure 1300. In the pipeline approach, each future register value must move through a series of hardware components per clock cycle. With many ancillary data registers in the pipeline approach, there may be many sources for the future register value, which creates a need for a larger result multiplexer and more complex logic to control the result multiplexer. Further, the depth of the stall logic is a key indicator of the speed of the register file design. Since the stall logic requires numerous hardware components, the cost of the pipeline approach may be prohibitive. In the scoreboard approach, the availability of the future register value is determined by retrieving the value of the age of the associated register and evaluating the age to determine availability.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. Accordingly, the specification and drawings are to be regarded as illustrative rather than restrictive.

What is claimed:

1. A system comprising:
    a processor operable to execute computing instructions comprising a computational instruction and a first part of a long instruction word instruction, a second part of the long instruction word instruction comprising an instruction extension, the long instruction word instruction including control bits to indicate a size of the long instruction word instruction;
    programmable logic operable to receive configuration data for defining the instruction extension and to execute the instruction extension;
    an extension adapter coupled to the processor and including logic operable to detect the long instruction word instruction and to determine whether an operation of the long instruction word instruction should be executed alternatively using the processor or using the programmable logic, the detected long instruction word instruction received by the extension adapter in response to an instruction fetch from the processor, the extension adapter operable to extend a set of native instructions defined by the processor and determine that a first operation of the long instruction word instruction is to be executed using the processor and a second operation of the long instruction word instruction is to be executed using the programmable logic;
    a first register file in the processor operable to store first data;
    a second register file coupled to the programmable logic and the extension adapter and operable to store second data; and
    a load store module operable to transfer the first data using the first register file, transfer the second data using the second register file, and transfer the second data directly between the second register file and a system memory.

2. The system of claim 1 further comprising:
    scoreboard circuitry configured to operate using the extension adapter, to receive a first individual instruction, to determine an age for one or more future register values based on the first individual instruction, and to store the age within a scoreboard data structure.

3. The system of claim 2 wherein the scoreboard circuitry is further configured to decrement the age and store the decremented age in the scoreboard data structure.

4. The system of claim 2 wherein the scoreboard circuitry is further configured to receive a second individual instruction and retrieve the age for the one or more future register values from the scoreboard data structure.

5. The system of claim 2 wherein the scoreboard circuitry is further configured to determine a write port characteristic for the one or more future register values based on the first individual instruction and store the write port characteristic within the scoreboard data structure.

6. The system of claim 5 wherein the scoreboard circuitry is further configured to receive a second individual instruction and retrieve the write port characteristic from the scoreboard data structure based on the second individual instruction.

7. The system of claim 2 wherein the scoreboard circuitry controls a wide register file.

8. The system of claim 1 wherein the second register is a wide register file.

9. A software module storage medium having embodied thereon a program, the program being executable by a processor to perform a method comprising:
    executing an instruction of a computer program, the computer program comprising a computational instruction and a long instruction word instruction, at least part of the long instruction word instruction comprising an instruction extension;
    receiving configuration data configured to define the instruction extension;
    detecting the long instruction word instruction using an extension adapter and determining whether an operation of the long instruction word instruction should be executed alternatively using the processor or using programmable logic;
    directing the processor core to store first data within a first register file;
    storing second data within a second register file coupled to the programmable logic and the extension adapter, the second register including a wide register file;
    directing a load store module operable to transfer the first data using the first register file, transfer the second data using the second register file, and transfer the second data directly between the second register file and a system memory;

directing a scoreboard circuitry to receive a first individual instruction;

determining an age for one or more future register values based on the first individual instruction;

storing the age within a scoreboard data structure using the scoreboard circuitry; and executing the instruction extension using the programmable logic.

10. The software module storage medium of claim 9 wherein the method further comprises executing the instruction extension as a native instruction of the processor using the programmable logic.

11. The software module storage medium of claim 9 wherein the long instruction word instruction comprises control bits to indicate a size of the long instruction word instruction.

12. The software module storage medium of claim 9 wherein the method further comprises:

directing the scoreboard circuitry to decrement the age; and storing the decremented age in the scoreboard data structure.

13. The software module storage medium software product of claim 9 wherein the method further comprises:

directing the scoreboard circuitry to receive a second individual instruction; and retrieving the age for the one or more future register values from the scoreboard data structure.

14. The software module storage medium of claim 9 wherein the method further comprises:

directing the scoreboard circuitry to determine a write port characteristic for the one or more future register values based on the first individual instruction; and storing the write port characteristic within the scoreboard data structure.

15. The software module storage medium of claim 14 wherein the method further comprises:

directing the scoreboard circuitry to receive a second individual instruction; and retrieving the write port characteristic from the scoreboard data structure based on the second individual instruction.

16. The software module storage medium of claim 9 wherein the method further comprises directing the scoreboard circuitry to control a wide register file.

17. A method for adding reconfigurable computational instructions to a computer, the method comprising:

executing a set of instructions of a computer program in a processor, the computer program comprising a computational instruction and a long instruction word instruction, at least part of the long instruction word instruction comprising an instruction extension;

receiving configuration data configured to define the instruction extension;

detecting the long instruction word instruction using an extension adapter and determining whether an operation of the long instruction word instruction should be executed alternatively using the processor or using programmable logic;

storing first data in a first register file;

storing second data in a second register file located in the extension adapter;

transferring the first data using the first register file;

transferring the second data using the second register file, the second register file including a wide register file;

transferring the second data directly between the second register file and a system memory; and executing the instruction extension using the programmable logic.

18. The method of claim 17 further comprising executing the instruction extension as a native instruction of the processor using the programmable logic.

19. The method of claim 17 wherein the long instruction word instruction comprises control bits to indicate a size of the long instruction word instruction.

20. The method of claim 17 further comprising:

receiving a first individual instruction;

determining an age for one or more future register values based on the first individual instruction; and storing the age within a scoreboard data structure using a scoreboard circuitry within the extension adapter.

21. The method of claim 20 further comprising:

decrementing the age; and storing the decremented age within the scoreboard data structure.

22. The method of claim 20 further comprising:

receiving a second individual instruction; and retrieving the age for the one or more future register values from the scoreboard data structure.

23. The method of claim 20 further comprising:

determining a write port characteristic for the one or more future register values; and storing the write port characteristic within the scoreboard data structure.

24. The method of claim 23 further comprising:

receiving a second individual instruction; and retrieving the write port characteristic from the scoreboard data structure based on the second individual instruction.

25. The method of claim 20 further comprising controlling a wide register file using the scoreboard circuitry.

* * * * *